US011950308B2

(12) United States Patent
Ozturk et al.

(10) Patent No.: US 11,950,308 B2
(45) Date of Patent: Apr. 2, 2024

(54) OPTIMIZED SECONDARY NODE REPORTING FOR MULTI-RADIO ACCESS TECHNOLOGY DUAL CONNECTIVITY

(71) Applicant: QUALCOMM Incorporated, San Diego, CA (US)

(72) Inventors: Ozcan Ozturk, San Diego, CA (US); Peng Cheng, Beijing (CN); Huichun Liu, Beijing (CN); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 17/309,056

(22) PCT Filed: Nov. 11, 2019

(86) PCT No.: PCT/CN2019/117085
§ 371 (c)(1),
(2) Date: Apr. 16, 2021

(87) PCT Pub. No.: WO2020/098596
PCT Pub. Date: May 22, 2020

(65) Prior Publication Data
US 2022/0039186 A1    Feb. 3, 2022

(30) Foreign Application Priority Data
Nov. 13, 2018    (WO) ................ PCT/CN2018/115217

(51) Int. Cl.
*H04W 76/16* (2018.01)
*H04W 24/10* (2009.01)
(Continued)

(52) U.S. Cl.
CPC ........... *H04W 76/16* (2018.02); *H04W 24/10* (2013.01); *H04W 72/1263* (2013.01); *H04W 76/19* (2018.02)

(58) Field of Classification Search
CPC ... H04W 24/10; H04W 76/15; H04W 76/116; H04W 76/19; H04W 76/27;
(Continued)

(56) References Cited

U.S. PATENT DOCUMENTS

2015/0271713 A1    9/2015  Kim et al.
2015/0282234 A1    10/2015 Sartori et al.
(Continued)

FOREIGN PATENT DOCUMENTS

CN    102742315 A    10/2012
CN    106105368 A    11/2016
(Continued)

OTHER PUBLICATIONS

Ericsson; "RRC suspend/resume in MR-DC" Agenda Item: 10.2.5 R2-1708024 (Revision of R2-1706634) 3GPP TSG-RAN WG2 #99 Berlin, Germany, Aug. 21-25, 2017 (Year: 2017).*
(Continued)

*Primary Examiner* — Gary Mui
(74) *Attorney, Agent, or Firm* — Arent Fox, LLP

(57) ABSTRACT

Inform a master node about the feasible of secondary node cells during resumption of dual connectivity may require a large message. Additionally, the message may need to be encrypted. A solution to overcome the size and security limitation is to report a short identifier (or index) which is only shared between the UE and the MN. Accordingly, an apparatus, e.g., a UE, may be configured to receive, from a master node, a configuration comprising a mapping of cell identities for a plurality of secondary cells for reporting SN measurements and transmitting an SN report comprising
(Continued)

measurements for at least a subset of the plurality of secondary cells using the mapping of cell identities. The apparatus may be configured to receive, from a first master node, a configuration for MN-DC, enter an inactive state or an idle state, and resume a connected state with a second master node.

16 Claims, 17 Drawing Sheets

(51) Int. Cl.
*H04W 72/1263* (2023.01)
*H04W 76/19* (2018.01)

(58) Field of Classification Search
CPC ......... H04W 72/1263; H04W 36/0033; H04W 36/0069; H04W 36/02
See application file for complete search history.

(56) References Cited

U.S. PATENT DOCUMENTS

| | | | |
|---|---|---|---|
| 2017/0265227 A1 | 9/2017 | Wang et al. | |
| 2018/0302914 A1 | 10/2018 | Da Silva et al. | |
| 2019/0387569 A1* | 12/2019 | Martinez Tarradell | H04W 76/27 |
| 2020/0029389 A1* | 1/2020 | Yilmaz | H04W 8/08 |
| 2020/0205123 A1* | 6/2020 | Byun | H04W 76/27 |
| 2020/0288338 A1* | 9/2020 | Freda | H04W 76/27 |
| 2020/0296637 A1* | 9/2020 | Teyeb | H04L 5/001 |
| 2020/0389823 A1* | 12/2020 | Xu | H04W 76/20 |
| 2021/0274587 A1* | 9/2021 | Jung | H04W 12/0433 |
| 2021/0337615 A1* | 10/2021 | Rugeland | H04W 76/27 |
| 2021/0385900 A1* | 12/2021 | Hori | H04W 76/15 |

FOREIGN PATENT DOCUMENTS

| | | |
|---|---|---|
| CN | 107889274 A | 4/2018 |
| WO | 2018186482 A1 | 10/2018 |
| WO | 2018232124 A1 | 12/2018 |
| WO | 2019031827 A1 | 2/2019 |
| WO | 2020015719 A1 | 1/2020 |

OTHER PUBLICATIONS

Qualcomm Incorporated: "MR-DC in RRC_Inactive State", 3GPP TSG-RAN2#103bis, R2-1813600, 3GPP Draft, R2-1813600_MR-DC_Inactive, 3rd Generation Partnership Project (3GPP), Mobile Competence Centre, 650, Route Des Lucioles, F-06921, Sophia-Antipolis Cedex, France, vol. RAN WG2, No. Chengdu, China, Oct. 8, 2018-Oct. 12, 2018, Sep. 27, 2018 (Sep. 27, 2018), XP051523099, pp. 1-7.
Item 1 Continued: Retrieved from the Internet: URL: http://www.3gpp.org/ftp/tsg%5Fran/WG2%5FRL2/TSGR2%5F103bis/Docs/R2%2D1813600%2Ezip [retrieved on Sep. 27, 2018] the whole document.
Supplementary European Search Report—EP19884015—Search Authority—Munich—dated Jul. 5, 2022.
"3GPP Working Group 3GPP TS 37.340 V0.1.1 Technical Specification Group Radio Access Network; Evolved Universal Terrestrial Radio Access (E-UTRA) and NR; Multi-connectivity; Stage 2 (Release 15)" Jun. 30, 2017 (Jun. 30, 2017), pp. 1-30, Sections 4-7, 9-10.
International Search Report and Written Opinion—PCT/CN2018/115217—ISA/EPO—dated Aug. 2, 2019.
International Search Report and Written Opinion—PCT/CN2019/117038—ISA/EPO—dated Feb. 1, 2020.
International Search Report and Written Opinion—PCT/CN2019/117085—ISA/EPO—dated Jan. 23, 2020.
Qualcomm Incorporated: "RRC Inactive and Dual Connectivity Coexistence", 3GPP SA WG2 Meeting #S2-122BIS, S2-176115, Aug. 25, 2017, (Aug. 25, 2017), 5 Pages, Figure 2, Sections 1-2.

* cited by examiner

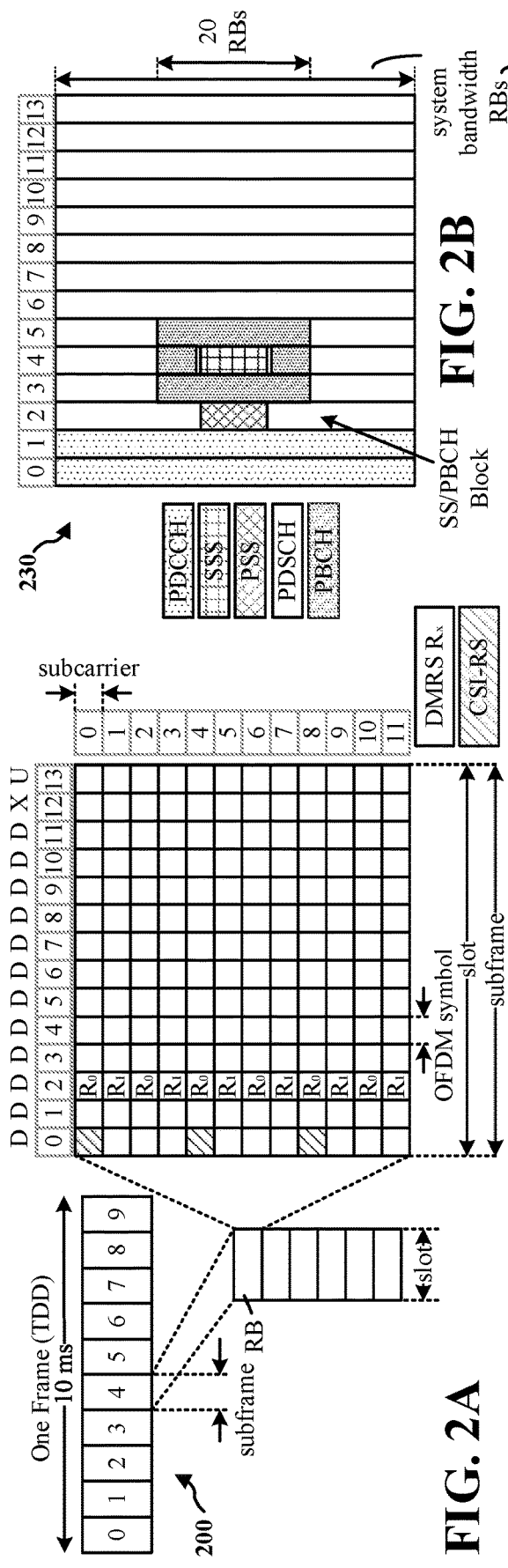
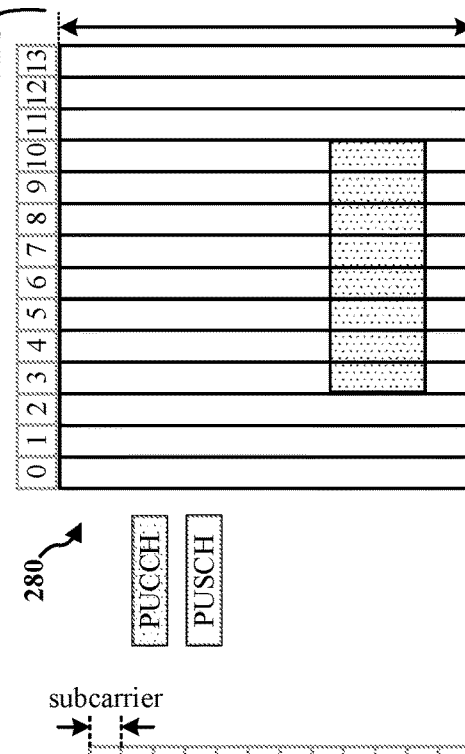
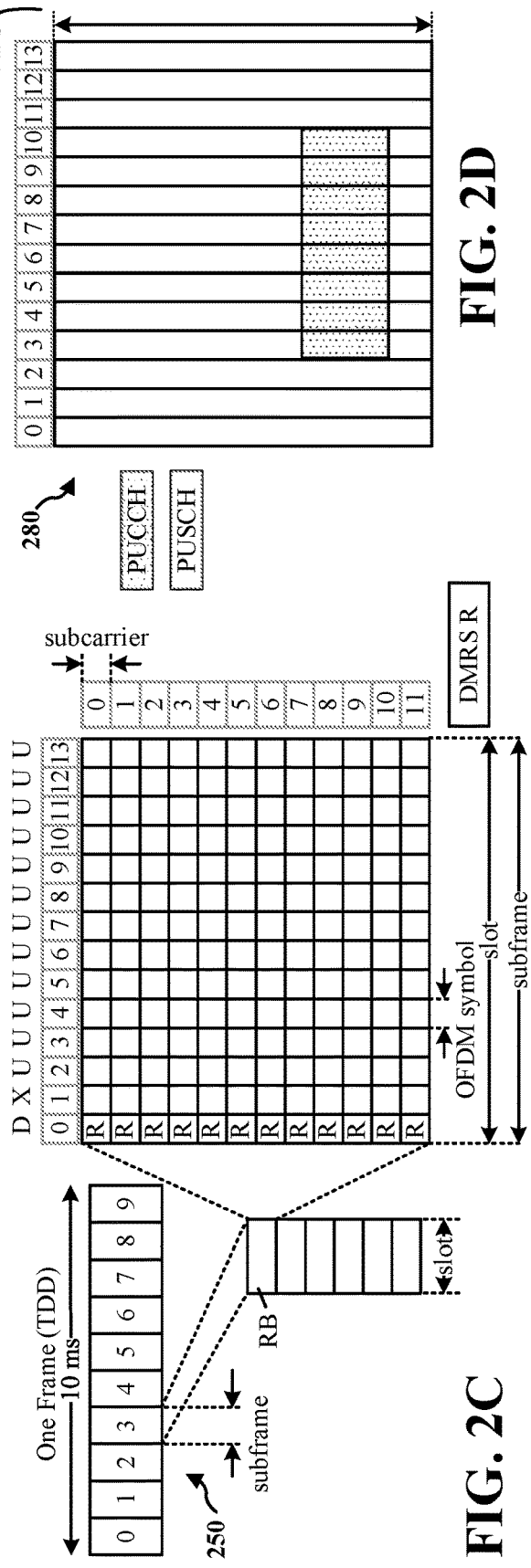
FIG. 2A
FIG. 2B
FIG. 2C
FIG. 2D

OPTIMIZED SECONDARY NODE REPORTING FOR MULTI-RADIO ACCESS TECHNOLOGY DUAL CONNECTIVITY

CROSS REFERENCE TO RELATED APPLICATION(S)

This application is a national stage entry of PCT Application No. PCT/CN2019/117085, entitled "OPTIMIZED SECONDARY NODE REPORTING FOR MULTI-RADIO ACCESS TECHNOLOGY DUAL CONNECTIVITY" and filed on Nov. 11, 2019, which claims priority to International PCT Application No. PCT/CN2018/115217, entitled "OPTIMIZED SECONDARY NODE REPORTING FOR MULTI-RADIO ACCESS TECHNOLOGY DUAL CONNECTIVITY" and filed on Nov. 13, 2018, both of which are expressly incorporated by reference herein in their entirety.

TECHNICAL FIELD

The present disclosure relates generally to communication systems, and more particularly, to a communication systems that may include dual connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

If dual connectivity operation is only supported in a connected mode, when a user equipment (UE) leaves the connected mode, any context regarding a secondary node is released. One issue that may occur when attempting to resume a dual connectivity connection is that the UE may have moved to a different location. At the new location, a previous secondary node may no longer be suitable to perform the functions of a secondary node. However, the UE may be unable to resume dual connectivity with a different master node than the master node that the UE was connected to when the dual connection was suspended. As well, there are challenges for inform the master node (or the new master node) about the feasibility of secondary node cells during resumption of dual connectivity.

Aspects herein provide solutions that enable a UE to inform the master node (or the new master node) about the feasibility of secondary node cells during resumption of dual connectivity by sending measurement results during the resumption of dual connectivity. The message size for the measurement results may be quite large, and aspects presented herein help to reduce the size of the report. Furthermore, sending a message with the measurement results may require security. Aspects presented herein not only help to reduce the message size but also add security to the measurement results reported by the UE.

The size may be reduced and security may be improved by using a short identifier (or index) which is only shared between the UE and the MN to report SN measurements. The correspondence between the actual identifiers for the SN cells and their indices for reporting can be configured, e.g., in the RRC Release message or earlier.

In an aspect of the disclosure, a method, a computer-readable medium, and an apparatus are provided. The apparatus may be a UE configured to receive, from a master node, a configuration comprising a mapping of cell identities for a plurality of secondary cells for reporting Secondary Node (SN) measurements and transmitting an SN report comprising measurements for at least a subset of the plurality of secondary cells using the mapping of the cell identities.

In an aspect of the disclosure, a method, a computer-readable medium, and an apparatus are provided. The apparatus may be a UE configured to receive, from a first master node, a configuration for Multi-Radio Access Technology (RAT) Dual Connectivity (MN-DC), enter, by the UE, an inactive state or an idle state while being served by the first master node or a secondary node, and resume a connected state with a second master node based on the configuration for MN-DC.

In an aspect of the disclosure, a method, a computer-readable medium, and an apparatus are provided. The apparatus may be a base station, such as a master node. The apparatus may be configured to configure a UE with a configuration comprising a mapping of cell identities for a plurality of secondary cells for reporting SN measurements and receive an SN report comprising measurements for at least a subset of the plurality of secondary cells using the mapping of the cell identities.

In an aspect of the disclosure, a method, a computer-readable medium, and an apparatus are provided. The apparatus may be a base station, such as a master node. The apparatus may be configured to configure a UE for MN-DC with the first master node, maintain an MN-DC context for the UE when the UE transitions to an inactive state or an idle state, and receive a message from a second master node indicating that the UE is resuming a connected state with the second master node.

In an aspect of the disclosure, a method, a computer-readable medium, and an apparatus are provided. The apparatus may be a base station, such as a master node. The apparatus may be configured to receive a resume message from a UE having MN-DC configured by a second master node and transmitting a message to the second master node indicating that the UE is resuming a connected state with the second master node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
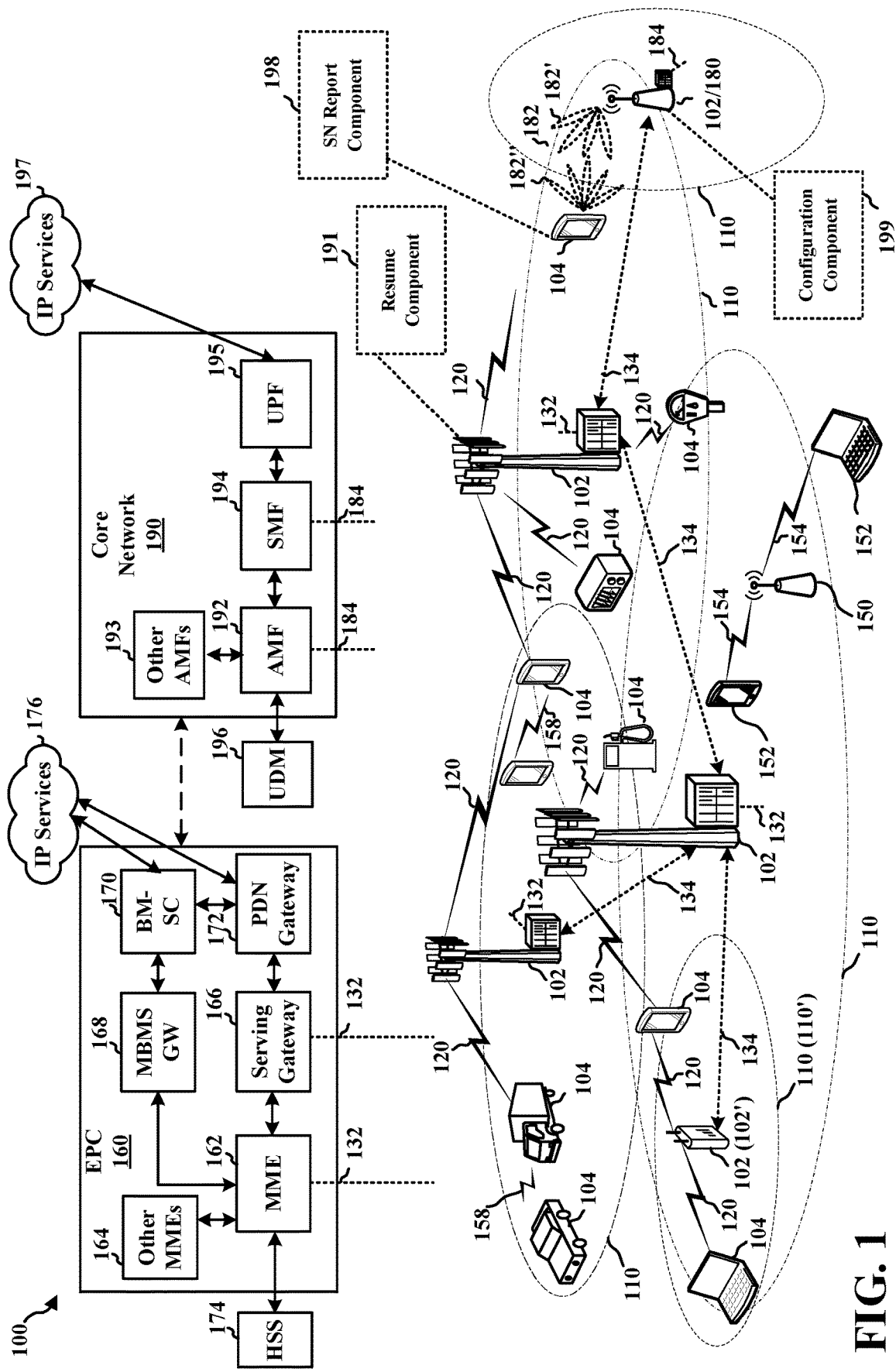
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, such as base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise an SN Report component 198 configured to receive, from a master node (e.g., a base station 102/180), a configuration comprising a mapping of cell identities for a plurality of secondary cells for reporting SN measurements and to transmit an SN report comprising measurements for at least a subset of the plurality of secondary cells using the mapping of the cell identities.

In another aspect, the UE may be configured to receive, from a first master node, a configuration for MN-DC, enter an inactive state or an idle state, and resume a connected state with a second master node, (e.g., another base station 102/180) based on the configuration for MN-DC.

The base station 102/180 may be a master node. Accordingly, the base station 102/180 may comprise a configuration component 199 that configures a UE with a configuration comprising a mapping of cell identities for a plurality of secondary cells for reporting SN measurements. The base station may then receive an SN report comprising measurements for at least a subset of the plurality of secondary cells using the mapping of the cell identities.

In another aspect, the configuration component 199 may enable the base station to configure a UE for MN-DC with the first master node, maintain an MN-DC context for the UE when the UE transitions to an inactive state or an idle state, and receive a message from a second master node indicating that the UE is resuming a connected state with the second master node.

In another aspect, the base station 102/180 may comprise a resume component 191 configured to receive a resume message from a UE having MN-DC configured by a second master node (e.g., another base station 102/180) and transmit a message to the second master node indicating that the UE is resuming a connected state with the second master node.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT)

spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
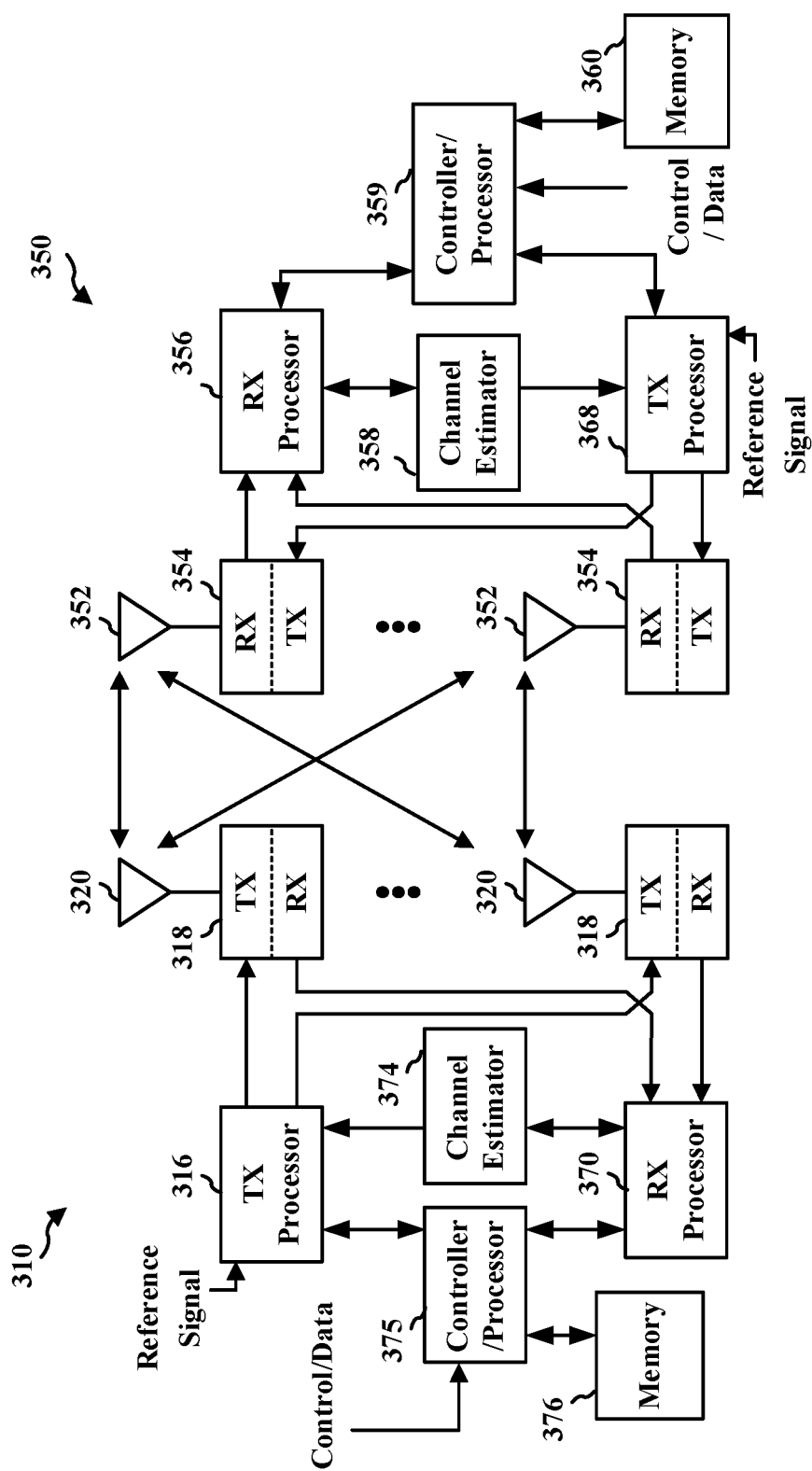
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wireless communication, such as NR, may include an inactive mode. The inactive mode may be referred to as the RRC_INACTIVE mode. In the inactive mode, the UE context may be kept at both the UE and the base station. A UE may not be required to perform as many tasks during the inactive mode as the UE is required to perform in the connected mode. For example, in the inactive mode, the UE may not need to monitor physical data channels. Additionally, in the inactive mode, the UE may not need to send channel feedback. Furthermore, in the inactive mode, the UE can perform mobility similar to an idle mode. For example, with the exception of making RAN area updates, the UE may move from one area to another area without informing the network.

In the active mode, the UE needs to monitor physical data channels and send channel feedback. Furthermore, in the active mode, the UE must inform the network when the UE moves from one area to another area (in addition to the RAN updates).

A base station may move the UE from the connected mode to the inactive mode by sending a release message to the UE. For example, the base station may send an RRC release message. The release message may include information necessary for suspension. The information for suspension may include, for example, RAN area and/or security key. The UE may move back to the connected mode by sending a resume request, e.g., to a base station.

In some types of communication, such as LTE, dual connectivity operation may only be supported in a connected mode. Accordingly, when a UE leaves the connected mode, any context regarding a secondary node would be released. One issue that may occur when attempting to resume a dual connectivity connection is that the UE may have moved to a different location. At the new location, a previous secondary node may no longer be suitable to perform the functions of a secondary node. Additionally, the UE may attempt to resume dual connectivity when connected to a different master node than the master node that the UE was connected to when the dual connection was suspended. Therefore, there is a problem in attempting to inform the master node (or the new master node) about the feasibility of secondary node cells during resumption of dual connectivity.

Aspects presented herein provide solutions that enable the UE to inform the master node (or the new master node) about the feasibility of secondary node cells during resumption of dual connectivity including sending measurement results during the resumption of dual connectivity. The message size for the measurement results may be quite large. Furthermore, a message with the measurement results may require security. Thus, the message might be limited until after security activation because measurement results should be secure by encryption under the certain requirements. The aspects presented herein provide a better way for the UE to inform the master node (or the new master node) about the feasibility of secondary node cells during resumption of dual connectivity by reducing the size of the message and/or providing added security to the measurements reported by the message.

Aspects to overcome the size and security limitations on such SN reports may involve reporting a short identifier (or index) which is only shared between the UE and the master node. The correspondence between the actual identifiers for the secondary node cells and their indices for reporting can be configured for the UE by the master node, e.g., in the RRC Release message or prior to the release message.

In one example, both the master node and the secondary node may operate using a same Radio Access Technology (RAT). For example, the master node and secondary nodes may both communicate using 5G based communication, e.g., including NR and/or eLTE. Furthermore, even though the systems and methods described herein are applied to inactive resumption, the concepts may also be applied to other scenarios.

Aspects may be applied when a UE moves from idle to connected. When a UE moves from idle mode to connected mode the configuration between the secondary cell identities and indices for SN measurement reporting may be broadcast by a bsae station, e.g., in a SIB.

Aspects may be applied when a UE re-establishes a connection at the same master node. In this example, the configuration between the secondary cell identities and the indices for reporting SN measurements may be received by the UE in an RRC reconfiguration while the UE was in a prior connected mode, e.g., prior to entering the idle mode that is being exited.

Furthermore, aspects may be applied for reporting SN measurements by a UE in the connected mode. The size reduction and security provided by the use of the short identifier/index improve the SN report even for a UE that is operating in a connected mode.

In an aspect, a master node may configure the UE with a mapping between cell identities and indices, e.g., for use by the UE to report SN measurements. The master node may configure the UE with the mapping between cell identities and indices in a message, e.g., an RRC Release message and/or an in an earlier RRC reconfiguration message. The cell identity may include one or more combinations of Physical Cell Identity (PCI), cell identity (unique within a PLMN), Cell Global Identity (CGI), PLMN ID, Tracking Area Identifier (TAI), and/or Radio Access Network Area Code (RNAC). Additionally, the configuration could also map to a bitmap where each bit corresponds to one of the cell identities.

In an aspect, a master node may configure a UE with a cell quality threshold. Example thresholds include Reference Signal Received Power (RSRP) level, Reference Signal Received Quality (RSRQ) level, and/or Signal to Interference and Noise Ratio (SINR) level. These levels may help the UE to control which secondary cells are reported in the SN report. A UE may determine whether or not to report a particular cell based on whether the measurement of RSRP level, RSRQ level, and/or SINR level meets the indicated threshold. If the secondary cell does meet the threshold, the index for the secondary cell may be included in the SN report. If the measurement for the secondary cell does not meet the threshold, the corresponding index may be left out of the SN report. Thus, only secondary cells with RSRP levels, RSRQ levels, and/or SINR levels above a quality threshold for RSRP levels, RSRQ levels, and/or SINR levels are reported. A node receiving an SN report including indices representing different secondary cells is able to determine at least a certain amount of measurement information about the secondary cells based solely on their inclusion in the SN report, e.g., the measurement at least meets the threshold.

In an aspect, the threshold, e.g., for RSRP level, RSRQ level, and/or SINR level, may be different for different cells and/or frequencies. A master node may communicate with other secondary nodes to determine a threshold for each secondary node. For example, a master node may communicate with other secondary nodes to determine a threshold for one or more of RSRP levels, RSRQ levels, and/or SINR levels each for one or more secondary nodes. The cell quality thresholds may be broadcasted in a SIB, e.g., by the master node and/or by secondary node(s). The reporting may be for a master node cell, a secondary node cell, or a combination of master node cells and secondary node cells.

The UE may report the cell indices during a resume process. The type of reporting employed by the UE may also vary depending on the message size. For example, for a limited message size, the UE limit the report to a subset of cells, e.g., a best secondary cell, a few of the secondary cells having the highest measurements, a predefined/configured number of cells having the highest measurements, etc. When a UE has more available message size and/or when the UE has fewer secondary cells to report, all of the secondary cells may be reported. In other examples, a number of cells may be reported, depending on the available bandwidth set aside for the communication of such messages. The bandwidth set aside for such messages may vary from communication system to communication system. The number of cells sent may depend on the number of cell messages that fit in the total message or a configured number of cells for sending such messages.

In an aspect, the UE may report of the secondary cell measurements in an RRC message. The message may comprise a message indicating completion of the resumption, e.g., an RRC resume complete message, such as a message5 in a RACH procedure and/or a message3 in a two-step RACH procedure. In another example, the SN report may be comprised in a request to resume the connection, e.g., an RRC resume request such as message 3 in a RACH procedure and/or message1 in a two-step RACH procedure.

When reporting in a request to resume an RRC connected state, e.g., message3 or message1 of two-step RACH), the UE may have limited space to report the SN measurements. At times, the UE may use a truncated resume ID in the message and may include the secondary cell indices (or bitmap) in the remaining space, e.g., including the space that becomes available by using a shorter resume ID. The master node may configure the UE with the option to the use a truncated resume ID or may otherwise indicate to the UE whether a truncated resume ID can be used with the master node. For example, the master node may broadcast an indication as to whether it is possible to use a truncated resume ID. Then, the UE may determine whether to use the truncated resume ID, and include the secondary cell indices (or bitmap) in the remaining space, based on whether the UE receives an indication in a broadcast from the master node.

The UE may have moved while in the inactive mode. Thus, the UE may attempt to resume the connection at another master node, e.g., when no secondary cells are suitable for DC. The new master node may communicate with the previous master node to enable the UE to resume the connection. For example, the new master node may provide an indication to the previous master node that the UE is attempting to resume the connection. The new master node may also receive an SN report from the UE. As the new master node will not be aware of the mapping configuration between the secondary cell identities and the indices used in the SN report, the new master node will be unable to decipher the measurement information. In one example, the new master node may forward the SN report information to the previous master node. The previous master node may then return to the new master node measurement information. In another example, the previous master node may respond to the new master node by transferring the UE context and/or by providing the mapping information. In this example, the new master node might not send the SN report to the previous master node, but instead may use the information from the previous master node to identify the cell identities in the SN report. The previous master node may determine whether to transfer the UE context based on whether any of the secondary cells in the SN report from the UE are suitable for DC. If not, the previous master node may forward the measurement results to the new master node with a UE context transfer. The anchor master node may provide the actual cell identifiers to the new master node.

Figure 4:
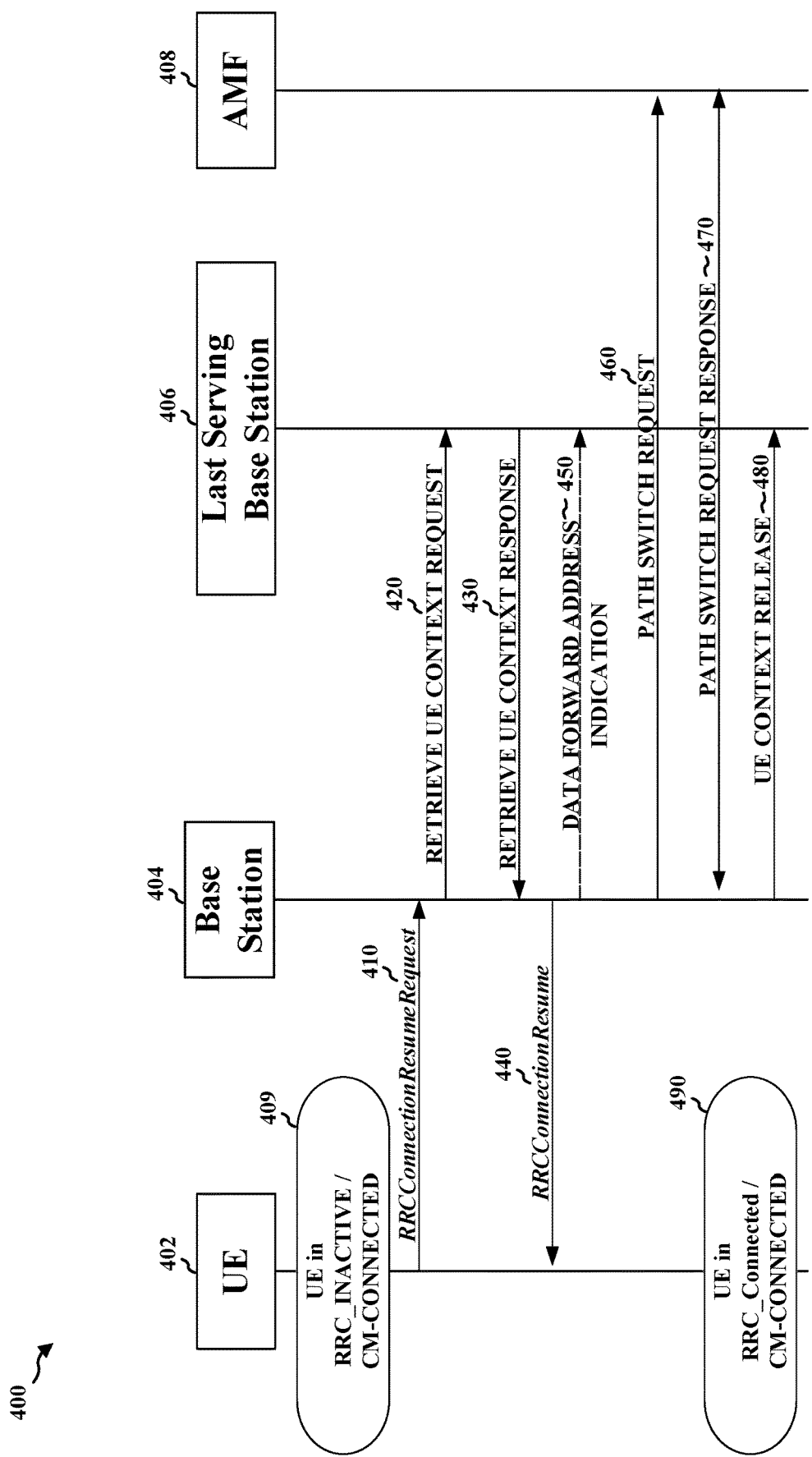
FIG. 4 is a signal diagram illustrating an example UE resume.

FIG. 4 is a signal diagram 400 illustrating an example UE resume. The diagram 400 illustrates signals between a UE 402, a base station 404 (such as a gNB), a last serving base station 406 (such as a last serving gNB), and access and mobility management function (AMF) 408. The diagram 400 illustrates the UE 402 starting in an inactive mode 409.

The UE 402 sends a connection resume request 410, e.g., RRCCConnectionResumeRequest, to the base station 404. The base station 404 may be a new base station as compared to the last serving base station 406. For example, the UE 402 may have been connected to the last serving base station 406 prior to being inactive, e.g., prior to the material illustrated in FIG. 4. The UE 402 may enter the inactive mode. When the UE 402 wishes to exit the inactive state, it may connect to a different base station, e.g., base station 404. As described herein, the connection resume request may include an SN report, e.g., using indices for secondary cell identities based on a prior mapping configured by a previous serving base station 406.

The new base station 404 may retrieve the context from the last serving base station 406. The retrieval may include an indication of the SN report. For example, the base station 404 may send a retrieve context request 420 to the last serving base station 406. Accordingly, the last serving base station 406 may retrieve the context information and send the context information to the base station 404 in a retrieve context response 430. The context information may include the mapping of secondary cell identities to indices for SN reporting that was configured for the UE by the last serving base station 406.

The base station 404 may instruct the UE 402 to resume using a resume message 440, e.g., RRCConectionResume.

As part of establishing itself as the new serving base station 404 to the UE 402, the base station 404 may send a forwarding address to the last serving base station 406 so that the last serving base station 406 may forward information for the UE 402 to the base station 404 so that the base station 404 may send the information to the UE 402. For example, the base station 404 may send a data forwarding address indication 450 to the last serving base station 406.

Additionally, the base station 404 may send a path switch request 460 to the AMF 408. The path switch request 460 may change the path of messages for the UE 402 such that messages for the UE 402 are sent to the base station 404 (for routing to the UE 402) rather than to the last serving base station 406. The AMF 408 may respond to the base station 404. For example, the AMF 408 may send a path switch request response 470 to the base station 404, e.g., confirming that the path switch request was received and/or acted on to switch the path to UE 402. Accordingly, the base station 404 may send a UE context release 480 to the last serving base station 406, and the UE 402 may be in connected mode 490 and connected to the new base station 404 rather than the last serving base station 406.

Figure 5:
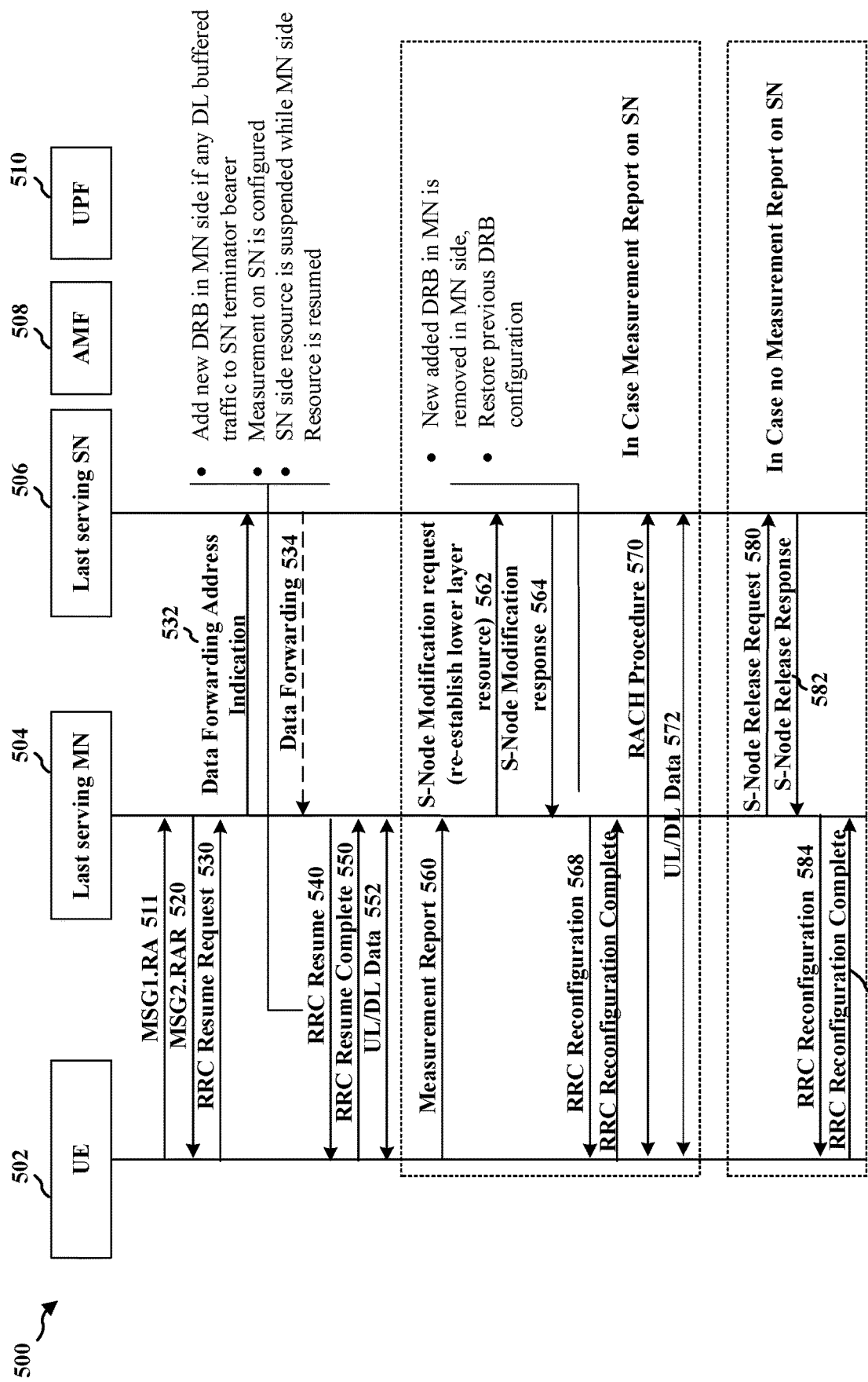
FIG. 5 is a signal diagram illustrating an example UE resume at a same master node for dual connectivity.

FIG. 5 is a signal diagram 500 illustrating an example UE resume at a same master node for dual connectivity. The diagram 500 illustrates signals between a UE 502, a last serving master node 504, a last serving secondary node 506, an AMF 508, and user plane function (UPF) 510. The steps of FIG. 5 illustrate one example of steps that may reestablish uplink and downlink connections between one or more of the last serving master node and the last serving secondary node.

The UE 502 may send a first random access message 511 to the last serving master node 504, e.g., Msg1. The last serving master node may respond with a random access response (RAR) message 520, e.g., Msg2.

The UE 502 may send a connection resume request 530, e.g., RRCResumeRequest, to the master node 504. As described herein, the connection resume request 530 may include an SN report, e.g., using indices for secondary cell identities based on a prior mapping configured by master node 504. The master node 504 sends a data forwarding indication 532 to the last serving secondary node 506. The last serving secondary node 506 may data forward 534 to the last serving master node.

The last serving master node 504 may send a resume message 540 to the UE 502, e.g., an RRCResume message.

Accordingly, the last serving secondary node 506 may add a new data radio bearer (DRB) in a master node side when any downlink buffer traffic is to the secondary node 506 terminated bearer. A measurement on the secondary node 506 may be confirmed, and the secondary node side resource may be suspended while the master node side resource is resumed.

The UE 502 may send a resume complete message 550 to the last serving master node, e.g., an RRCResumeComplete. In another example, the connection resume complete message 550 may include the SN report, e.g., using indices for secondary cell identities based on a prior mapping configured by the master node 504. Accordingly, uplink data and downlink data 552 may be exchanged between the UE 502 and the last serving master node 504. Accordingly, a connection between the UE 502 and the last serving master node 504 may be reestablished.

In a case when a measurement report is on the secondary node 506, the UE 502 may send a measurement report 560 to the last serving master node 504, which may send an S-node modification request 562 to the last serving secondary node 506. The S-node modification request may re-establish lower layer resources, e.g., between the UE 502 and the last serving secondary node 506. The last serving secondary node 506 may respond with an S-node modification response 564.

The last serving master node 504 may send a reconfiguration message 568, e.g., RRCReconfiguration, to the UE 502. The UE 502 may respond to the last serving master node 504 with a reconfiguration complete message 586, e.g., RRCReconfigurationComplete. The new DRB in the master node may be removed in the master node side, and the previous DRB configuration may be restored.

A random access (RACH) procedure 570 between the UE 502 and the last serving secondary node 506 may be performed. Accordingly, uplink data and downlink data 572 may be exchanged between the UE 502 and the last serving secondary node 506. Accordingly, a connection between the UE 502 and the last serving secondary node 506 may be reestablished.

In a case when no measurement report is on the secondary node 506, the last serving master node may send an S-node release request 580. The last serving secondary node may respond with an S-node release response 582. The last serving master node 504 may transmit a reconfiguration message 584, e.g., RRCReconfiguration, to the UE 502 and the UE may respond to the last serving master node 504 with a reconfiguration complete message 586, e.g., RRCReconfigurationComplete.

Figure 6:
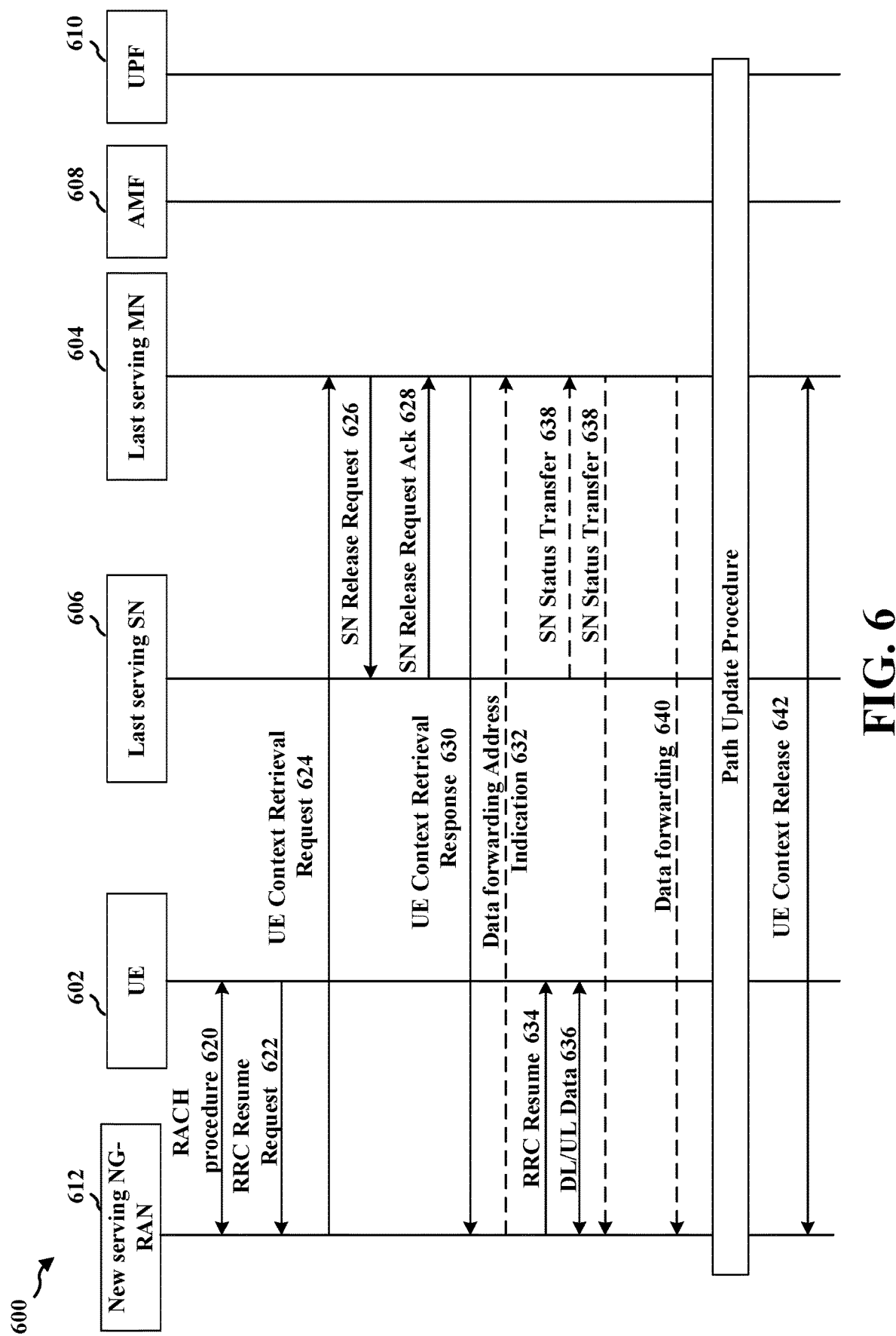
FIG. 6 is a signal diagram illustrating an example UE resume at a different master node for dual connectivity.

FIG. 6 is a signal diagram illustrating an example UE resume at a different master node for dual connectivity. The diagram 600 illustrates signals between a UE 602, a last serving master node 604, a last serving secondary node 606, an AMF 608, and UPF 610. FIG. 6 illustrates a new serving RAN 612.

A RACH procedure 620 may be performed between the new serving RAN 612 and the UE 602. The UE 602 may send a resume request 622 to the new serving RAN 612. For example, the UE 602 may send an RRC Resume Request to the new serving NG-RAN 612. Accordingly, the UE 602 may resume at a different master node for dual connectivity (e.g., new serving NG-RAN 612) rather than the last serving master node 604 and/or the last serving secondary node 606. The resume request may include an SN report using the mapping of secondary cell identities to indices previously configured for the UE by the last serving master node 604. The new RAN 612 may receive information about the mapping in the configuration from previous master node 604 and/or may send the SN report to the previous master node 604. In another example, the UE may send the SN report using the mapping of secondary cell identities to indices previously configured for the UE by the last serving master node 604 in a resume complete message to the new RAN 612.

As part of resuming at a different master node for dual connectivity (e.g., new serving NG-RAN 612) rather than the last serving master node 604 and/or the last serving secondary node 606, the new serving NG-RAN 612 may send a UE content retrieval request 624 message to the last serving master node 604.

The last serving master node 604 may release the last serving secondary node from serving the UE 602 by sending a secondary node release request 626 to the last serving secondary node 606. The last serving secondary node 606 may acknowledge the release by sending a secondary node release request acknowledge 628 to the last serving master node 604.

The last serving master node 604 may send context for the UE 602 to the new serving NG-RAN 612 by sending a UE context retrieval response 630 to the new serving NG-RAN 612. Optionally, the new serving NG-RAN 612 send a data forward address indication 632 to the last serving master node 604 so that the last serving master node 604 may forward information for the UE 602 to the new serving NG-RAN 612.

The new serving NG-RAN 612 may send a resume message 634, e.g., RRC Resume to the UE 602. Accordingly, the new serving NG-RAN 612 and the UE 602 may exchange downlink data and uplink data 636. In some aspects, the last serving secondary node 606 may send a secondary node status transfer 638 to the last serving master node 604. The last serving master node 604 may send a secondary node status transfer 638 to the new serving NG-RAN 612 and may forward data 640 to the new serving NG-RAN 612. Accordingly, the path data uplink procedure may be complete and the last serving master node and the new serving NG-RAN 612 may exchange information releasing the UE context 642.

Figure 7:
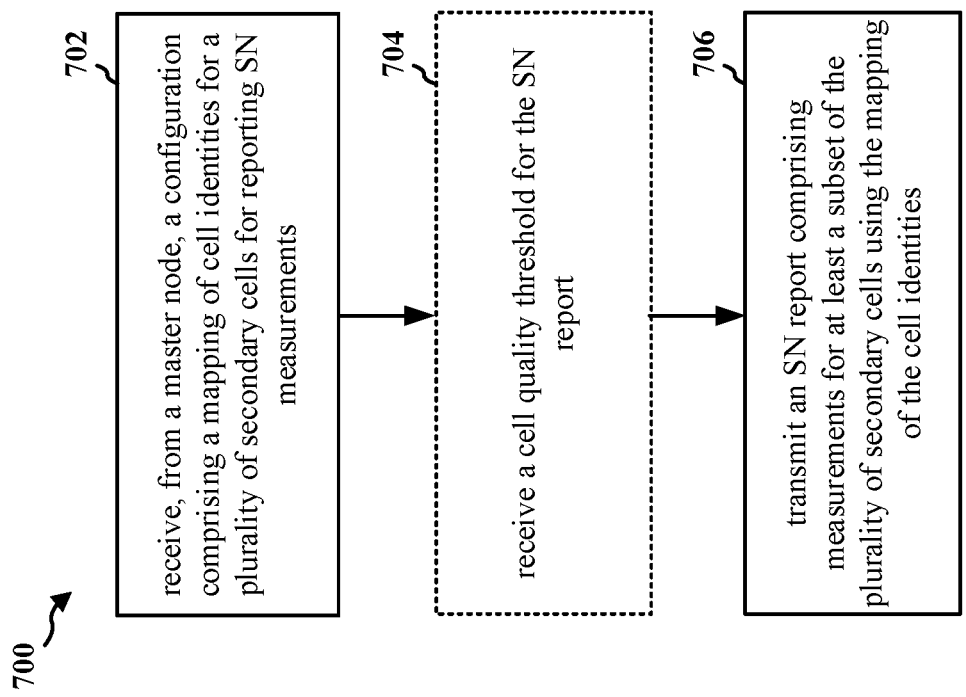
FIG. 7 is a flowchart of a method of wireless communication.

FIG. 7 is a flowchart 700 of a method of wireless communication. The method may be performed by a UE (e.g., UE 104, 350, 402, 502, 602, the apparatus 902, 902') in wireless communication with a master node (e.g., the base station 102, 180, 310, 404, 505, 604, 950). The UE may be configured for MN-DC, for example. The method presented herein enables improved and more efficient communication of an SN report from a UE. Aspects of the method help the UE to reduce a size of the SN report while also providing an added level of security for the information included in the report. Optional aspects are illustrated with a dashed line.

At 702, the UE receives, from a master node, a configuration comprising a mapping of cell identities for a plurality of secondary cells for reporting SN measurements. The reception of the configuration may be performed, e.g., by the mapping component 908 of the apparatus 902 in FIG. 9. The configuration may be received in an RRC release message and/or an RRC reconfiguration message. Each cell identity may comprise at least one of a PCI, a cell identity that is unique within a PLMN, a CGI, a PLMN ID, a TAI, or a RNAC. The mapping may map each cell identity to a corresponding index. The configuration may comprise a bitmap in which each bit corresponds to one of the plurality of secondary cells.

At 706, the UE transmits transmit an SN report comprising measurements for at least a subset of the plurality of secondary cells using the mapping of the cell identities. The transmission of the SN report may be performed, e.g., by the SN report component 910 of the apparatus 902 in FIG. 9. The UE may transmit the SN report as part of an inactive resumption, a move from an idle state to a connected state at a same master node, a re-establishment, or while in a connected mode. The SN report may comprise the measurements for the subset of the plurality of secondary cells having a highest quality. As another example, the SN report may comprise the measurements for the subset of the plurality of secondary cells based on a message size for the SN report. As yet another example, the SN report may comprise the measurements for the subset of the plurality of secondary cells based on a configured number of cells to be reported in the SN report. The SN report may be comprised in any of an RRC connection request, an RRC re-establishment request, and/or an RRC resume request. The RRC resume message may comprise a truncated resume ID and indices or a bitmap for secondary cells from among the plurality of secondary cells for which the measurements are indicated in the SN report. The UE may use the truncated resume ID based on an indication from the master node or from a new master node. The indication may be comprised in an RRC configuration in an RRC release message from the master node or a broadcast from the master node or the new master node. The SN report may also be comprised in an RRC resume complete message.

As illustrated at 704, the UE may receive a cell quality threshold for the SN report. The reception of the cell quality threshold may be performed by the threshold component 912 of the apparatus 912 in FIG. 9. The cell quality threshold may be based on one or more of an RSRP level, an RSRQ level, or an SINR level. Different cell quality thresholds may be received for different cells and/or for different frequencies. A secondary cell may be included in the SN report, at 706, if a measured quality for the secondary cell meets the cell quality threshold. If the measured quality for the secondary cell does not meet the cell quality threshold, the UE may determine not to include the secondary cell in the SN report. The cell quality threshold may be received in a broadcast from the master node or a secondary node. The cell quality threshold may be received in SI) from the master node or a secondary node.

Figure 8:
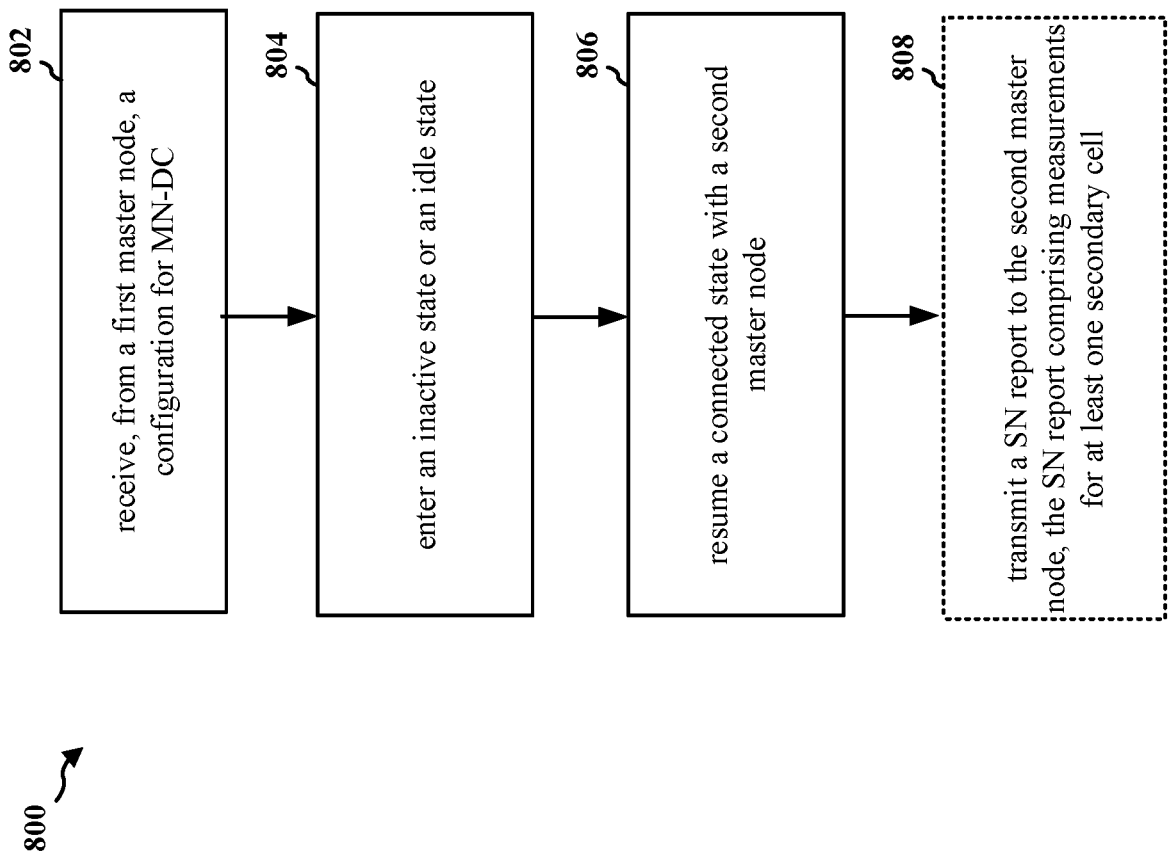
FIG. 8 is a flowchart of a method of wireless communication.

FIG. 8 is a flowchart 800 of a method of wireless communication. The method may be performed by a UE (e.g., UE 104, 350, 402, 502, 602, the apparatus 902, 902') in wireless communication with a master node (e.g., the base station 102, 180, 310, 404, 505, 604, 950) followed by communication with a new master node (e.g., 612). The UE may be configured for MN-DC, for example. The method presented herein enables improved and more efficient communication of an SN report from a UE when reestablishing communication via a new master node. Optional aspects are illustrated with a dashed line.

At 802, the UE receives a configuration for MN-DC. The reception of the configuration may be performed by the MN-DC component 916 of the apparatus 902 in FIG. 9. The UE may receive the configuration for the MN-DC from a first master node.

While configured for MN-DC, the UE may enter an inactive state or an idle state, at 804, e.g., while being served by the first master node or a secondary node. The entering of the inactive state may be performed by the first state component 918 of the apparatus 902 in FIG. 9. The entering of the idle state may be performed by the first state component 918 of the apparatus 902 in FIG. 9. The configuration may include information for reporting SN measurement, e.g., as described in connection with FIG. 7.

At a point in time after entering the inactive state/idle state, the UE may resume a connected state with a second master node based on the configuration for MN-DC, at 806. The resuming of the connected state with the second master node may be performed by the second state component 920 of the apparatus 902 in FIG. 9. Due to mobility or other factors, the UE may attempt to reestablish a connection with a node that is different than the node that configured the UE for MN-DC and/or different than the master node that is currently maintaining the UE's context.

As illustrated at 808, the UE may transmit an SN report to the second master node, the SN report comprising measurements for at least one secondary cell. The transmission of the SN report to the second master node may be performed by the SN report component 910 of the apparatus 902 in FIG. 9. The SN report may be based on mapping information that was configured by the previous master node, e.g., as described in connection with FIG. 7, and the new master node may not know the mapping information. Thus, the new master node may need to communicate with the previous master node to obtain the SN measurements from the SN report.

Figure 9:
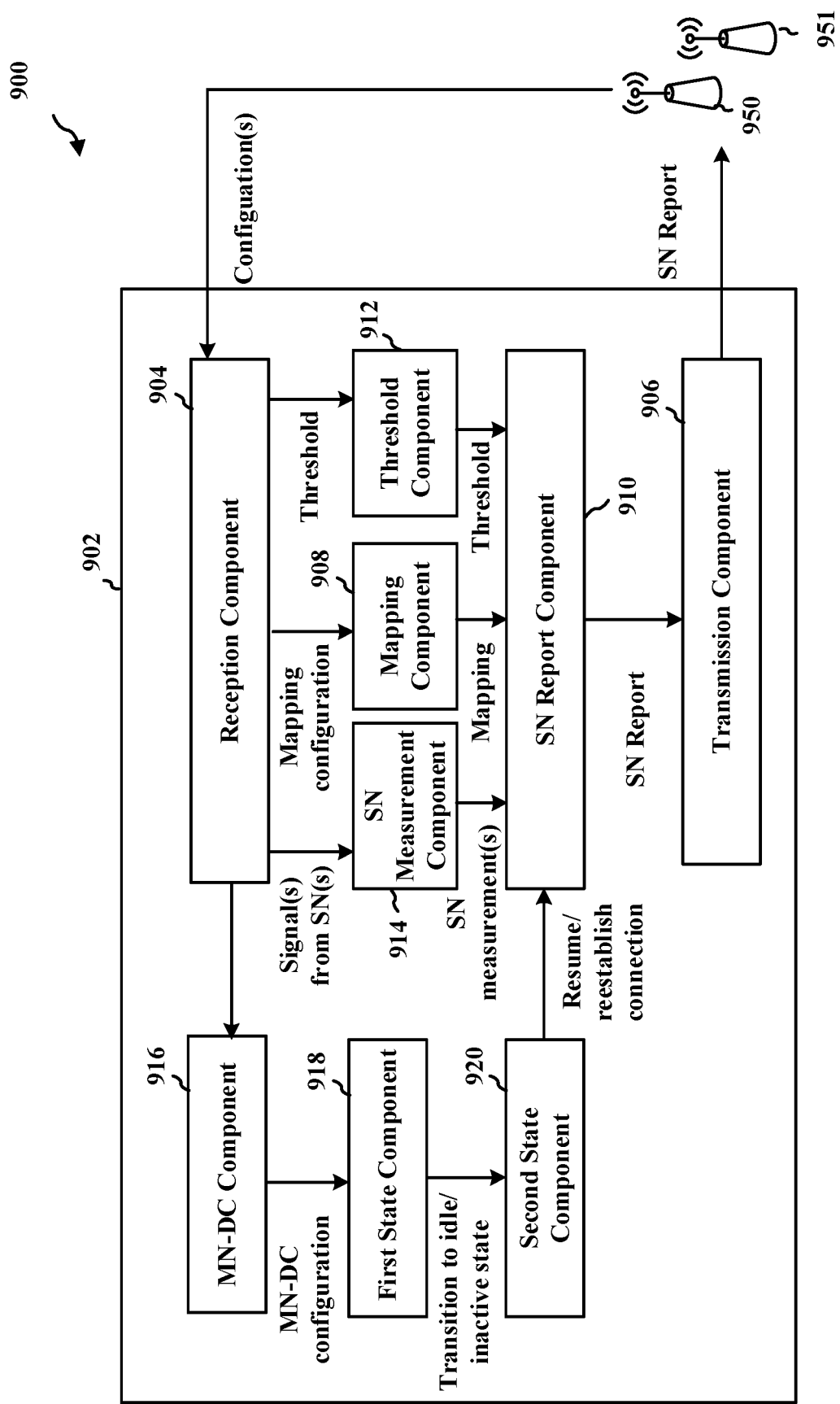
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE or a component of a UE (e.g., UE 104, 350, 402, 502, 602) in wireless communication with a master node 950 (e.g., base station 102, 180, 310, 404, 505, 604) followed by communication with a new master node 951 (e.g., base station 102, 180, 310, 612). The apparatus includes a reception component 904 configured to receive downlink communication from the master node(s), and a transmission component 906 configured to transmit uplink communication to the master node(s).

The apparatus may include a mapping component 908 configured to receive, from a master node 950, a configuration comprising a mapping of cell identities for a plurality of secondary cells for reporting SN measurements, e.g., as described in connection with 702. The apparatus may include an SN report component 910 configured to transmit an SN report comprising measurements for at least a subset of the plurality of secondary cells using the mapping of the cell identities, e.g., as described in connection with 706. The SN report may comprise SN measurements performed by SN measurement component 914. The apparatus may include a threshold component 912 configured to receive a cell quality threshold for the SN report, e.g., as described in connection with 704.

The apparatus may include an MN-DC component 916 configured to receive, from a first master node 950, a configuration for MN-DC, e.g., as described in connection with 802. The apparatus may comprise a first state component 918 configured to have the UE enter an inactive state or an idle state, e.g., as described in connection with 804. The apparatus may include a second state component 920 configured to resume a connected state with a second master node 951, e.g., as described in connection with 806. The SN report component 910 may be configured to transmit an SN report to the second master node 951, the SN report comprising measurements for at least one secondary cell, e.g., as described in connection with 808.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
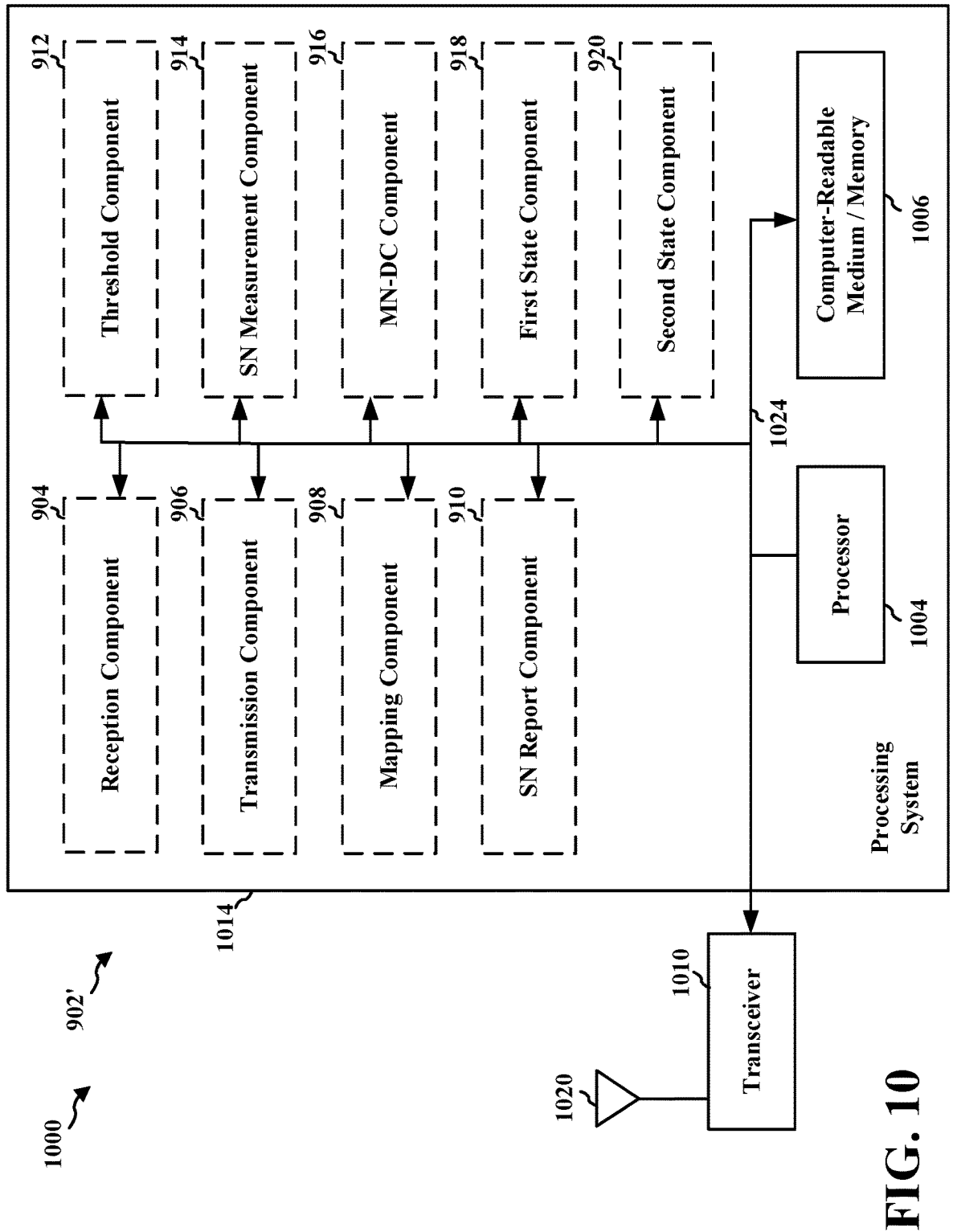
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may comprise the entire UE 350.

In one configuration, the apparatus 902/902' for wireless communication includes means for receiving, from a master node, a configuration comprising a mapping of cell identities for a plurality of secondary cells for reporting SN measurements (e.g., at least mapping component 908). The apparatus may include means for transmitting an SN report comprising measurements for at least a subset of the plurality of secondary cells using the mapping of the cell identities (e.g., at least SN report component 910). The apparatus may include means for receiving a cell quality threshold for the SN report. The apparatus may include means for receiving, from a first master node, a configuration for MN-DC (e.g., at least MN-DC component 916). The apparatus may include means for entering an inactive state or an idle state (e.g., at least first state component 918). The apparatus may include means for resuming a connected state with a second master node (e.g., at least first state component 920). The apparatus may include means for transmitting an SN report to the second master node, the SN report comprising measurements for at least one secondary cell (e.g., at least SN report component 910). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
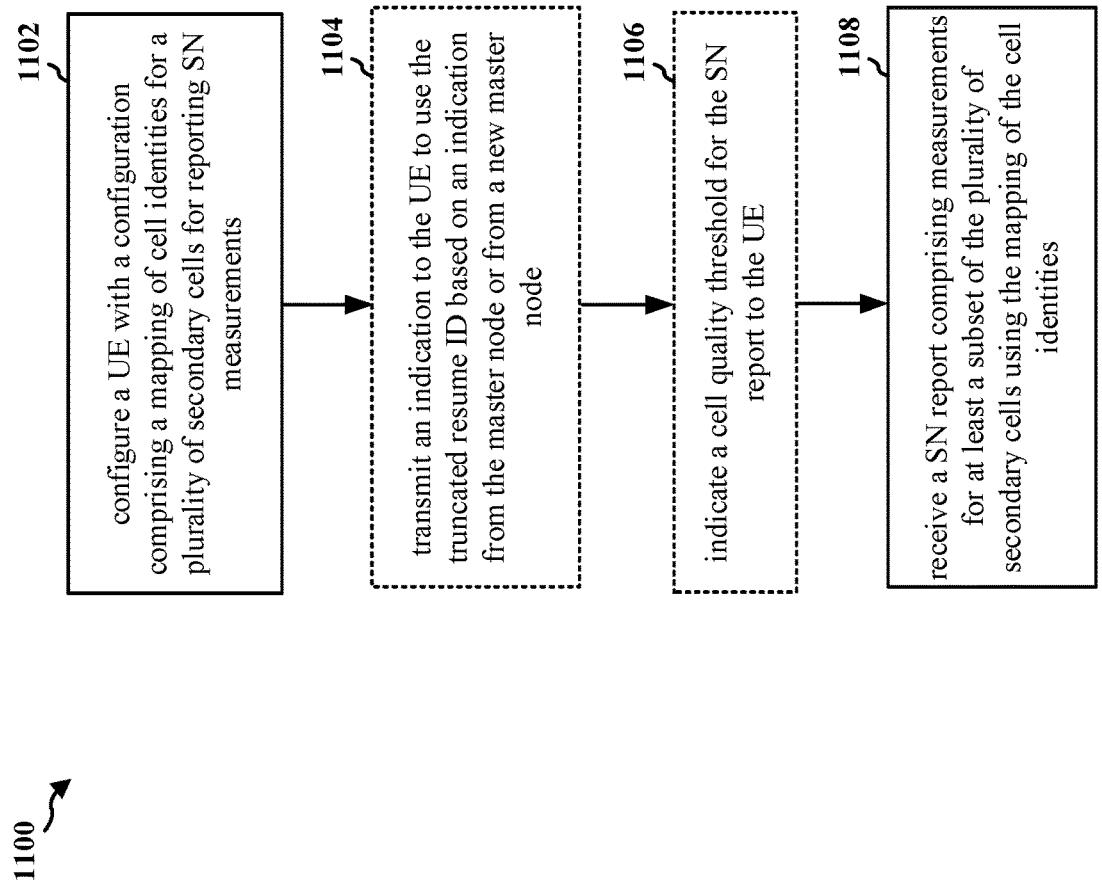
FIG. 11 is a flowchart of a method of wireless communication.

FIG. 11 is a flowchart 1100 of a method of wireless communication. The method may be performed by a master node (e.g., the base station 102, 180, 310, 404, 505, 604, 950, the apparatus 1302, 1302') in wireless communication with a UE (e.g., UE 104, 350, 402, 502, 602, 1351 the apparatus 902, 902'). The master node may be a master node of a UE configured for MN-DC, for example. The method presented herein enables improved and more efficient receipt of an SN report from a UE. Aspects of the method help to reduce a size of the SN report while also providing an added level of security for the information included in the report. Optional aspects are illustrated with a dashed line.

At 1102, the master node configures a UE with a configuration comprising a mapping of cell identities for a plurality of secondary cells for reporting SN measurements. The configuring of the UE with the configuration comprising the mapping of cell identities may be performed by the mapping component 1308 of the apparatus 1302 of FIG. 13. The configuration may be transmitted in an RRC release message and/or an RRC reconfiguration message. Each cell identity may comprise at least one of a PCI, a cell identity that is unique within a PLMN, a CGI, a PLMN ID, a TAI, or a RNAC. The mapping may map each cell identity to a corresponding index. The configuration may comprise a bitmap in which each bit corresponds to one of the plurality of secondary cells.

At 1108, the master node receives an SN report comprising measurements for at least a subset of the plurality of secondary cells using the mapping of the cell identities. The receiving of the SN report may be performed by the SN report component 1310 of the apparatus 1302 of FIG. 13. The master node may receive the SN report as part of an inactive resumption, a move from an idle state to a connected state at a same master node, a re-establishment, or while in a connected mode. The SN report may comprise the measurements for the subset of the plurality of secondary cells having a highest quality. As another example, the SN report may comprise the measurements for the subset of the plurality of secondary cells based on a message size for the SN report. As yet another example, the SN report may comprise the measurements for the subset of the plurality of secondary cells based on a configured number of cells to be reported in the SN report. The SN report may be comprised in any of an RRC connection request, an RRC re-establishment request, and/or an RRC resume request.

The RRC resume message may comprise a truncated resume ID and indices or a bitmap for secondary cells from among the plurality of secondary cells for which the measurements are indicated in the SN report. The master node may transmit, at 1104, an indication to the UE to use the truncated resume ID based on an indication from the master node or from a new master node. The transmitting of the indication to the UE may be performed by the indication component 1314 of the apparatus 1302 of FIG. 13. The indication may be comprised in an RRC configuration in an RRC release message from the master node or a broadcast from the master node or the new master node. The SN report may also be comprised in an RRC resume complete message.

As illustrated at 1106, the master node may indicate a cell quality threshold for the SN report. The indication of the cell quality threshold may be performed by the threshold component 1312 of the apparatus 1302 of FIG. 13. The cell quality threshold may be based on one or more of an RSRP level, an RSRQ level, or an SINR level. Different cell quality thresholds may be indicated for different cells and/or for different frequencies.

Inclusion of a secondary cell in the SN report, received at 1108, may indicate that a measured quality for the secondary cell meets the cell quality threshold. The receiving of the SN report may be performed by the SN report component 1310 of the apparatus 1302 of FIG. 13. If the measured quality for the secondary cell does not meet the cell quality threshold, the UE may determine not to include the secondary cell in the SN report. The cell quality threshold may be indicated to the UE in a broadcast from the master node or a secondary node. The cell quality threshold may be indicated in SI from the master node, or a secondary node.

Figure 12:
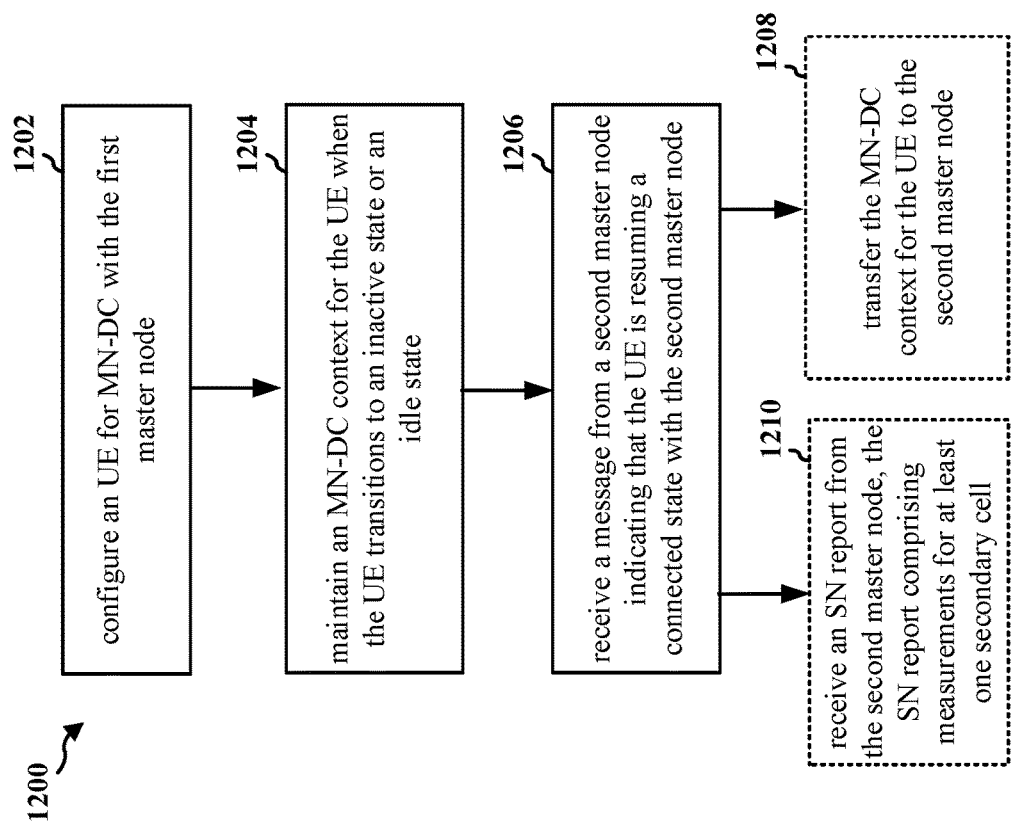
FIG. 12 is a flowchart of a method of wireless communication.

FIG. 12 is a flowchart 1200 of a method of wireless communication. The method may be performed by a master node (e.g., the base station 102, 180, 310, 404, 505, 604, 950, the apparatus 1302, 1302') in wireless communication with UE (e.g., UE 104, 350, 402, 502, 602, 1351 the apparatus 902, 902') and/or with a second master node (e.g., the base station 102, 180, 310, 612, 1350, the apparatus 1502, 1502'). The UE may be configured for MN-DC, for example. The method presented herein enables improved and more efficient communication of an SN report from a UE when reestablishing communication via a new master node. Optional aspects are illustrated with a dashed line.

At 1202, the master node configures a UE for MN-DC. The configuring of the UE may be performed by the MN-DC component 1316 of apparatus 1302 of FIG. 13. The UE configured for MN-DC may allow the UE to connect to a different master node (e.g., a second master node) when attempting to resume a dual connectivity connection.

The master node maintains an MN-DC context for the UE, at 1204, e.g., including when the UE transitions to an inactive state or idle state. The maintaining of the MN-DC context may be performed by the context component 1318 of apparatus 1302 of FIG. 13. The master node maintaining the MN-DC context may assist the UE in connecting to another master node or resuming a dual connectivity connection.

At 1206, the master node receives a message from a second master node indicating that the UE is resuming a connected state. The receiving of the message from the second master node may be performed by the second master node component 1320 of apparatus 1302 of FIG. 13. The message from the second master node may indicate that the UE is resuming the connected state with the second master node.

In one example, in response to receiving the message at 1204, the master node may transfer the MN-DC context for the UE to the second master node, at 1208. The transferring of the MN-DC context may be performed by the transfer component 1320 of apparatus 1302 of FIG. 13. Once transferred, the master node may no longer be responsible to maintain the context of the UE, and the new master node may maintain the UE's context. The MN-DC context may include configuration information, e.g., including mapping information for receiving SN reports from the UE, as described in connection with FIG. 11.

If the first master node continues to maintain the MN-DC context for the UE after receiving the message from the second master node, at 1210, the base station may receive an SN report from the second master node. The receiving of the SN report may be performed by the SN report component 1310 of apparatus 1302 of FIG. 13. The SN report may comprise measurements for at least one secondary cell. The master node may process the message and provide any needed information to the new master node.

Figure 13:
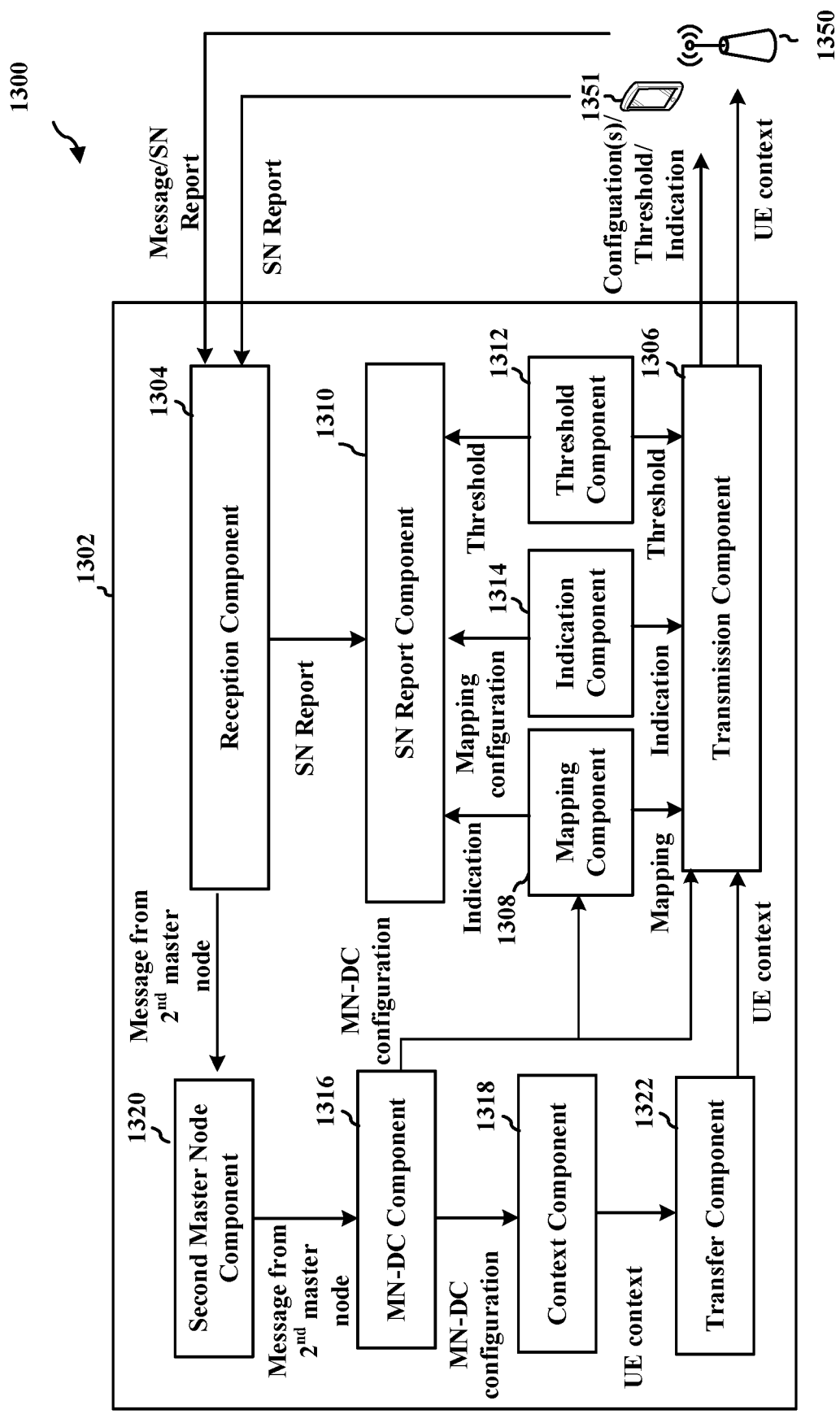
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a master node or a component of a master node (e.g., base station 102, 180, 310, 404, 505, 604, 950) in communication with a UE 1351 (e.g., UE 104, 350, 402, 502, 602, the apparatus 902, 902') and/or with a second master node 1350 (e.g., base station 102, 180, 310, 612, 951). The apparatus includes a reception component 1304 configured to receive communication from the UE and/or other master node, and a transmission component 1306 configured to transmit communication to the UE and/or other master node.

The apparatus may include a mapping component 1308 that configures a UE with a configuration comprising a mapping of cell identities for a plurality of secondary cells for reporting SN measurements (e.g., as described in connection with 1102). The apparatus may include an SN report component 1310 configured to receive an SN report comprising measurements for at least a subset of the plurality of secondary cells using the mapping of the cell identities (e.g., as described in connection with 1108). The apparatus may include a threshold component 1312 configured to indicate a cell quality threshold for the SN report to the UE (e.g., as described in connection with (e.g., as described in connection with 1106). The apparatus may include an indication component 1314 configured to transmit an indication to the UE to use the truncated resume ID based on an indication from the apparatus or from a new master node (e.g., as described in connection with 1104). The apparatus may include an MN-DC component 1316 that configures a UE for MN-DC with the apparatus (e.g., as described in connection with 1202). The apparatus may include a context component 1318 configured to maintain an MN-DC context for the UE when the UE transitions to an inactive state or an idle state (e.g., as described in connection with 1204). The apparatus may include a second master node component 1320 configured to receive a message from a second master node indicating that the UE is resuming a connected state with the second master node (e.g., as described in connection with 1206). The apparatus may include a transfer component 1322 configured to transfer the MN-DC context for the UE to the second master node (e.g., as described in connection with 1208). The apparatus may include a SN report component 1310 configured to receive an SN report from the second master node, the SN report comprising measurements for at least one secondary cell, e.g., where the apparatus continues to maintain the MN-DC context for the UE after receiving the message from the second master node (e.g., as described in connection with 1210).

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
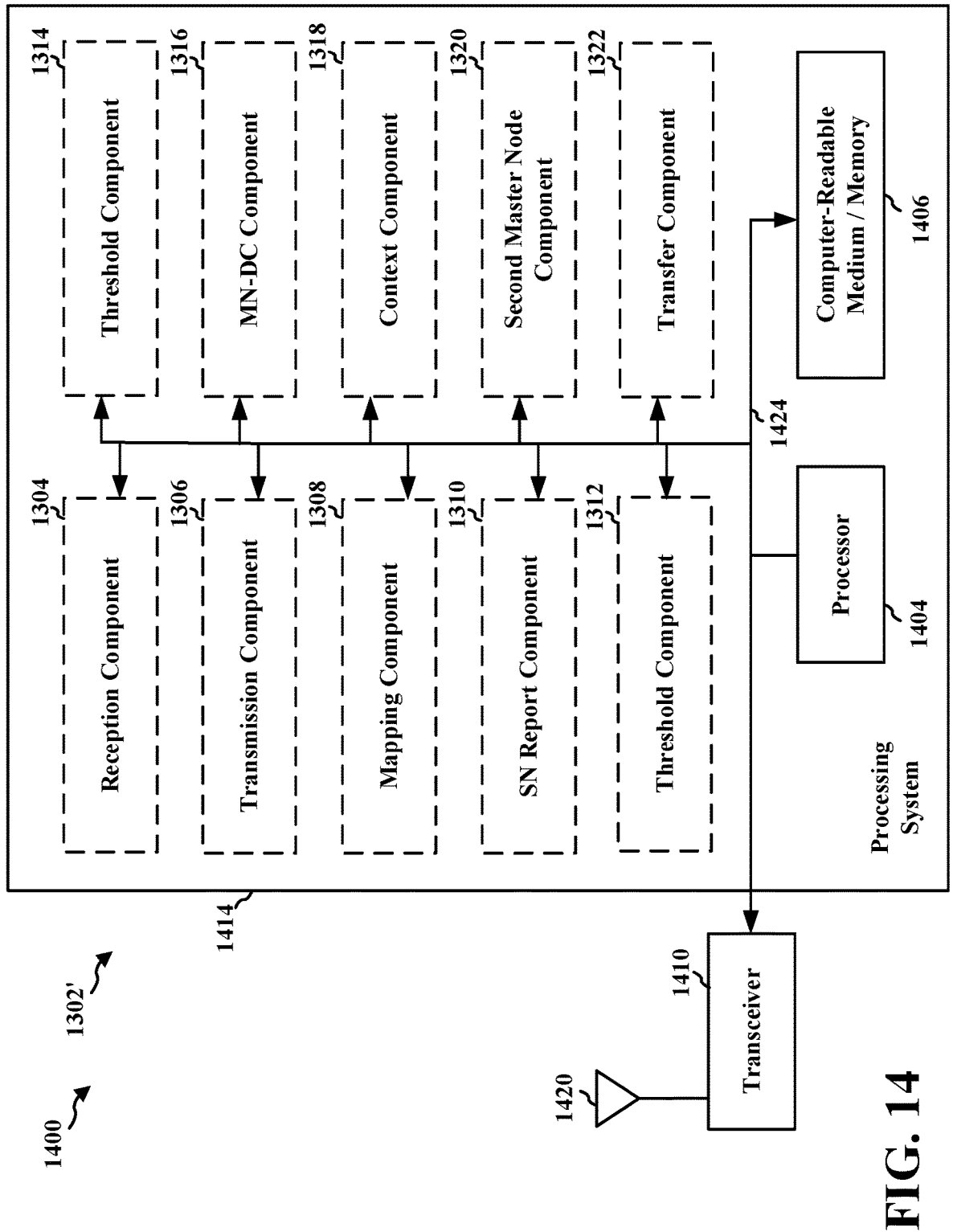
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, 1320, 1322, and the computer-readable medium/ memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320, 1322. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system may comprise the entire base station 310.

In one configuration, the apparatus 1302/1302' for wireless communication includes means for configuring a UE with a configuration comprising a mapping of cell identities for a plurality of secondary cells for reporting SN measurements (e.g., at least mapping component 1308). The apparatus may include means for receiving an SN report comprising measurements for at least a subset of the plurality of secondary cells using the mapping of the cell identities (e.g., at least SN report component 1310). The apparatus may include means for indicating a cell quality threshold for the SN report to the UE (e.g., at least threshold component 1312). The apparatus may include means for transmitting an indication to the UE to use the truncated resume ID based on an indication from the apparatus or from a new master node (e.g., at least indication component 1314). The apparatus may include means for configuring a UE for MN-DC with the apparatus (e.g., at least MN-DC component 1316). The apparatus may include means for maintaining an MN-DC context for the UE when the UE transitions to an inactive state or an idle state (e.g., at least context component 1318). The apparatus may include means for receiving a message from a second master node indicating that the UE is resuming a connected state with the second master node (e.g., at least second master node component 1320). The apparatus may include means for transferring the MN-DC context for the UE to the second master node (e.g., at least transfer component 1322). The apparatus may include means for receiving an SN report from the second master node, the SN report comprising measurements for at least one secondary cell, e.g., where the apparatus continues to maintain the MN-DC context for the UE after receiving the message from the second master node (e.g., at least SN report component 1310). The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
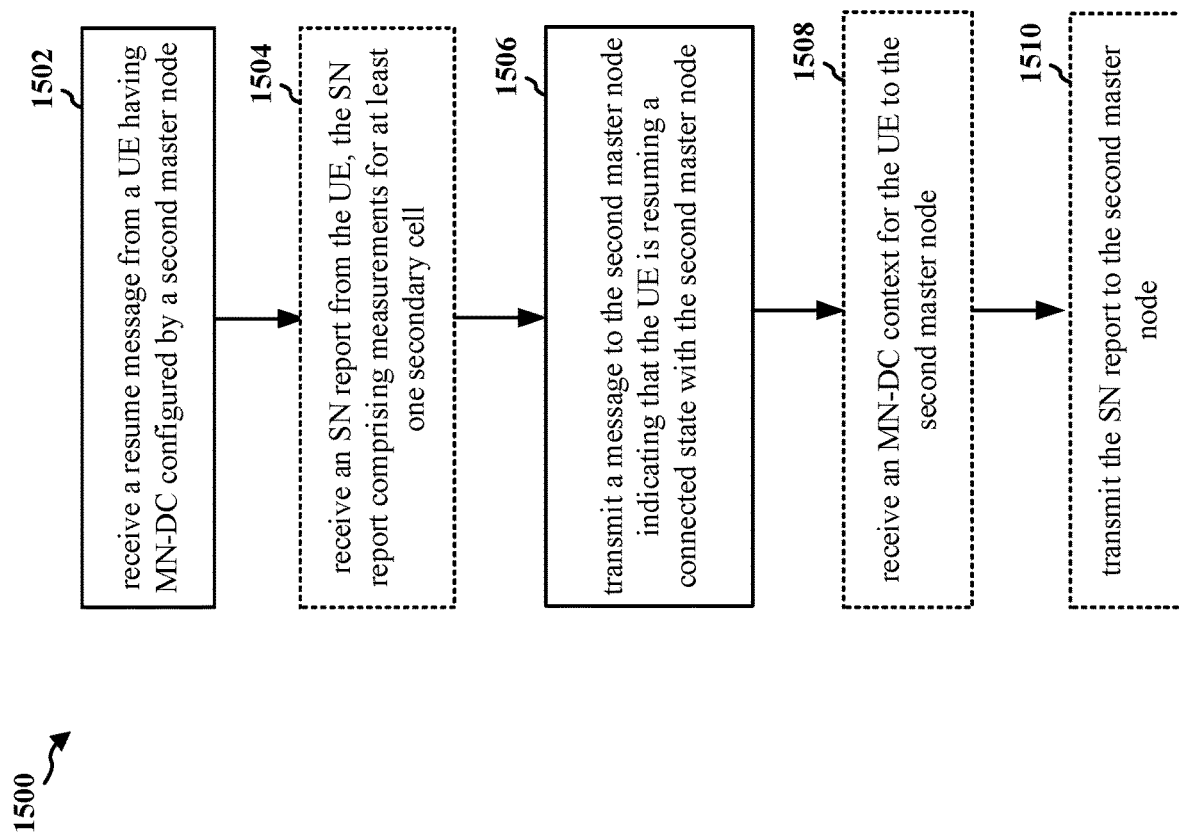
FIG. 15 is a flowchart of a method of wireless communication.

FIG. 15 is a flowchart 1500 of a method of wireless communication. The method may be performed by a master node (e.g., base station 102, 180, 310, 612, 951, 1350, the apparatus 1602, 1602') in wireless communication with a UE (e.g., UE 104, 350, 402, 502, 602, 1351, 1650, the apparatus 902, 902') and with the UE's prior master node (e.g., the base station 102, 180, 310, 404, 505, 604, 950, 1651, the apparatus 1302, 1302'). The master node may be a new master node of a UE configured for MN-DC by the previous master node, for example. The method presented herein enables a UE context for MN-DC to be maintained even when the UE enters an idle/inactive mode and further improves efficient receipt of an SN report from a UE. Aspects of the method help to reduce a size of the SN report while also providing an added level of security for the information included in the report. Optional aspects are illustrated with a dashed line.

At 1502, the master node may receive a resume message from a UE having MN-DC configured by a second master node, e.g., the UE's prior master node. The receiving of the resume message may be performed by the resume component 1608 of apparatus 1602 of FIG. 16. The resume message may indicate that the UE may attempt to resume a connection with a different master node, such as the second master node.

At 1506, the master node may transmit a message to the second master node indicating that the UE is resuming a connected state with the second master node. The transmitting of the message to the second master node may be performed by the message component 1610 of apparatus 1602 of FIG. 16. The message transmitted to the second master node from the first master node may prepare the second master node to allow the UE to resume the connected state with the second master node.

The master node may receive an SN report from the UE, at 1504. The receiving of the SN report may be performed by the SN report component 1614 of apparatus 1602 of FIG. 16. Although illustrated as occurring before the master node sends the message 1506, the SN report may be received in a different order, e.g., after sending message 1506. The message may be based on a mapping, e.g., as described in connection with FIGS. 7 and 11. Thus, the master node may need to know the mapping information configured by the prior master node.

The second master node may respond by providing the MN-DC context to the new master node. Thus, at 1508, the master node may receive an MN-DC context for the UE from the second, prior master node. The receiving of the MN-DC context may be performed by the context component 1612 of apparatus 1602 of FIG. 16. Once the master node receives the UE context, the master node may maintain the UE context as part of MN-DC. The master node may use the MN-DC context for the UE to process the SN report received from the UE. If the second, prior master node has transferred the UE context for MN-DC to the master node, then the master node may use mapping information in the UE's MN-DC context to determine the secondary cells being reported in the SN report. Additionally, the prior master node may provide the mapping information to the new master node without transferring the UE context.

If the prior master node did not transfer the UE context and/or did not provide mapping information to the new master node, the new master node may transmit the SN report to the second master node, at 1510. The new master node may then receive information based on the SN report from the prior master node. The transmitting of the SN report may be performed by the report provision component 1616 of apparatus 1602 of FIG. 16. Thus, rather than determining the SN measurements itself, the new master node may simply provide the SN report to the prior master node, and the prior master node may determine which secondary cells are reported.

Figure 16:
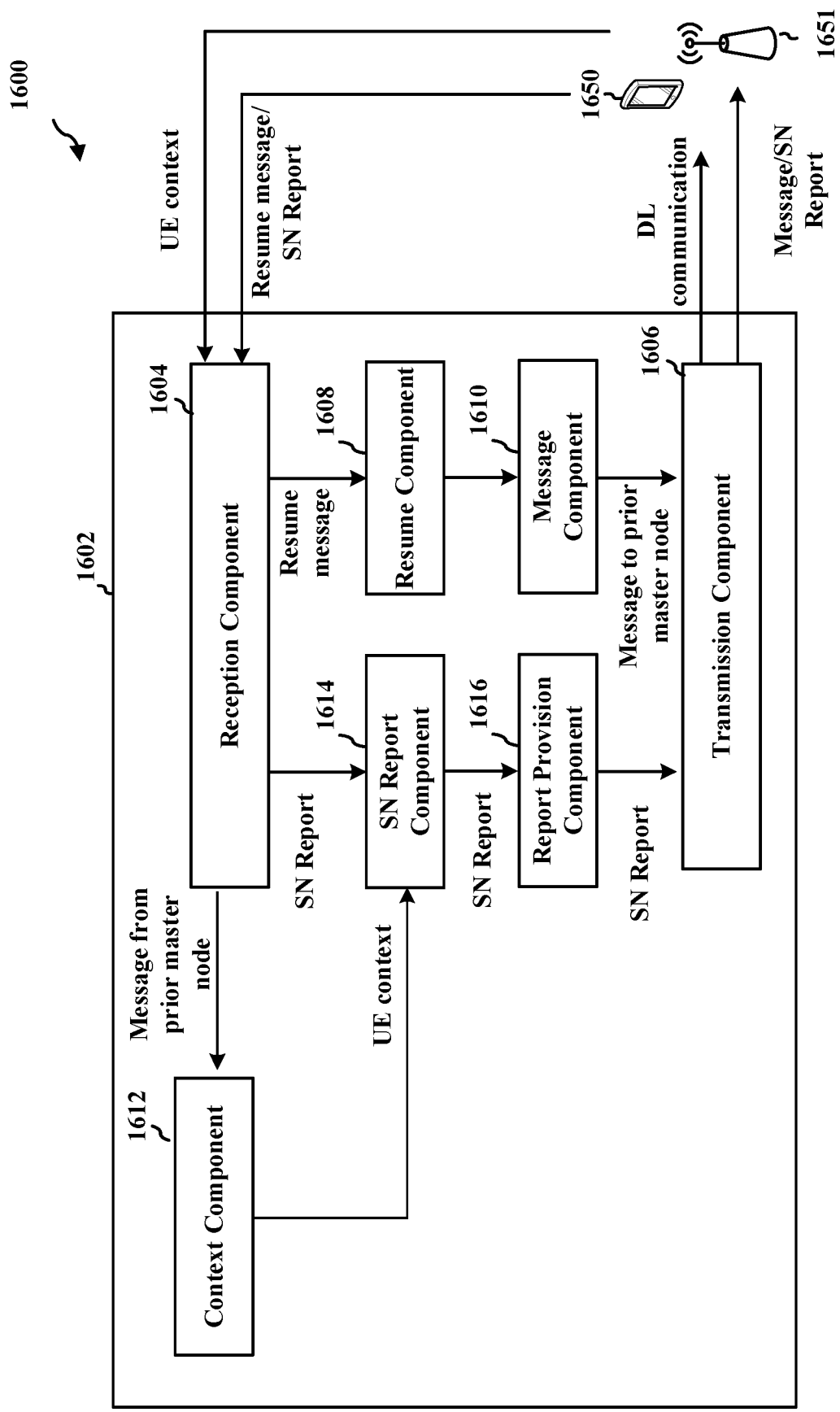
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a master node or a component of a master node (e.g., base station 102, 180, 310, 612, 951, 1350) in wireless communication with a UE 1650 (e.g., UE 104, 350, 402, 502, 602, 1351, the apparatus 902, 902') and with the UE's prior master node 1651 (e.g., the base station 102, 180, 310, 404, 505, 604, 950, the apparatus 1302, 1302'). The master node may be a new master node of a UE configured for MN-DC by the previous master node, for example. The apparatus includes a reception component 1604 configured to receive communication from the UE and/or other master node, and a transmission component 1606 configured to transmit communication to the UE and/or other master node.

The apparatus may include a resume component 1608 configured to receive a resume message from a UE having MN-DC configured by a second master node (e.g., as described in connection with 1502). The apparatus may include a message component 1610 configured to transmit a message to the second master node indicating that the UE is resuming a connected state with the second master node (e.g., as described in connection with 1506). The apparatus may include a context component 1612 configured to receive an MN-DC context for the UE to the second master node (e.g., as described in connection with 1508). The apparatus may include an SN report component 1614 configured to receive an SN report from the UE, the SN report comprising measurements for at least one secondary cell (e.g., as described in connection with 1504). The apparatus may include a report provision component 1616 configured to transmit the SN report to the second master node (e.g., as described in connection with 1510).

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
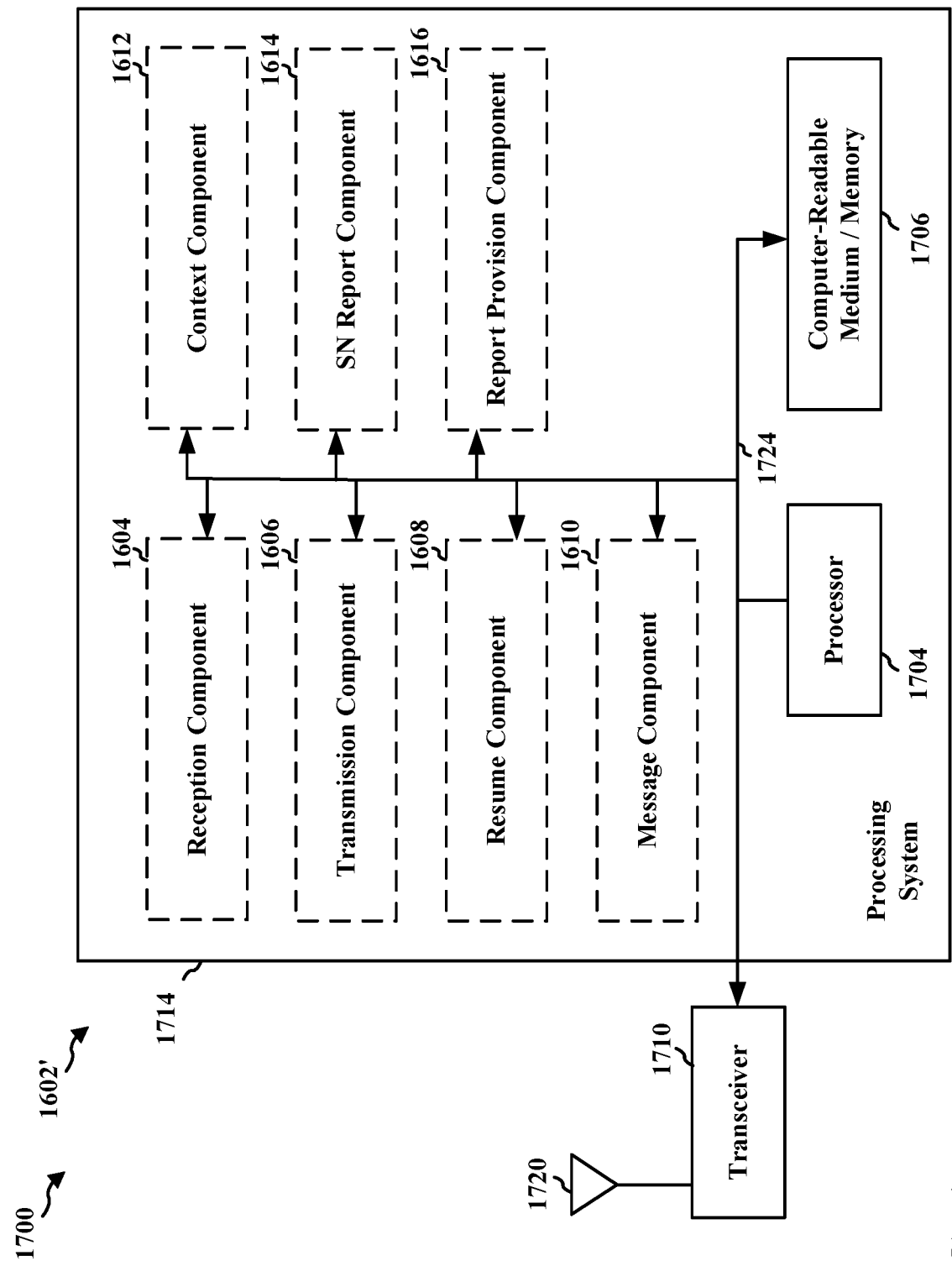
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may comprise the entire base station 310.

In one configuration, the apparatus 1602/1602' for wireless communication includes means for receiving a resume message from a UE having MN-DC configured by a second master node (e.g., at least resume component 1608). The apparatus may include means for transmitting a message to the second master node indicating that the UE is resuming a connected state with the second master node (e.g., at least message component 1610). The apparatus may include means for receiving an MN-DC context for the UE to the second master node (e.g., at least context component 1612). The apparatus may include means for receiving an SN report from the UE, the SN report comprising measurements for at least one secondary cell (e.g., at least SN report component 1614). The apparatus may include means for transmitting the SN report to the second master node (e.g., at least report provision component 1616). The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    receiving, from a first master node, a configuration for Multi-Radio Access Technology (RAT) Dual Connectivity (MN-DC);
    entering, by the UE, an inactive state or an idle state while being served by the first master node or a secondary node;
    resuming a connected state with a second master node based on the configuration for MN-DC; and
    transmitting a Secondary Node (SN) report to the second master node, the SN report comprising measurements for at least one secondary cell;
    wherein the SN report is based on mapping information configured by the first master node.

2. A method of wireless communication at a first Master Node comprising:
    configuring a User Equipment (UE) for Multi-Radio Access Technology (RAT) Dual Connectivity (MN-DC) with the first master node;
    maintaining an MN-DC context for the UE when the UE transitions to an inactive state or an idle state;
    receiving a message from a second master node indicating that the UE is resuming a connected state with the second master node; and
    transferring the MN-DC context for the UE to the second master node.

3. The method of claim 2, wherein the MN-DC context for the UE that is transferred to the second master node comprises mapping information for a Secondary Node (SN) report.

4. The method of claim 2, wherein the first master node continues to maintain the MN-DC context for the UE after receiving the message from the second master node, the method further comprising:
    receiving a Secondary Node (SN) report from the second master node, the SN report comprising measurements for at least one secondary cell.

5. The method of claim 4, wherein the SN report is based on mapping information configured for the UE by the first master node.

6. The method of claim 4, further comprising processing the SN report and providing information based on the SN report to the second master node.

7. A method of wireless communication at a first Master Node comprising:
    receiving a resume message from a User Equipment (UE) having Multi-Radio Access Technology (RAT) Dual Connectivity (MN-DC) configured by a second master node;
    transmitting a message to the second master node indicating that the UE is resuming a connected state with the second master node; and
    receiving an MN-DC context for the UE from the second master node.

8. The method of claim 7, further comprising:
    receiving a Secondary Node (SN) report from the UE, the SN report comprising measurements for at least one secondary cell; and
    processing the SN report based on the MN-DC context received from the second master node.

9. The method of claim 8, wherein the MN-DC context for the UE that is received from the second master node comprises mapping information for the SN report that is configured by the first master node.

10. The method of claim 7, wherein the second master node continues to maintain the MN-DC context for the UE, the method further comprising:
    receiving a Secondary Node (SN) report from the UE, the SN report comprising measurements for at least one secondary cell; and
    transmitting the SN report to the second master node.

11. The method of claim 10, further comprising receiving information about the SN report from the second master node.

12. An apparatus of wireless communication at a first master node, the apparatus comprising:
    a memory; and
    at least one processor coupled to the memory and configured to:

receive a resume message from a User Equipment (UE) having Multi-Radio Access Technology (RAT) Dual Connectivity (MN-DC) configured by a second master node;

transmit a message to the second master node indicating that the UE is resuming a connected state with the second master node; and receive an MN-DC context for the UE from the second master node.

13. The apparatus of claim 12, wherein the at least one processor is further configured to:

receive a Secondary Node (SN) report from the UE, the SN report comprising measurements for at least one secondary cell; and process the SN report based on the MN-DC context received from the second master node.

14. The apparatus of claim 13, wherein the MN-DC context for the UE comprises mapping information for the SN report that is configured by the first master node.

15. The apparatus of claim 12, wherein the second master node continues to maintain the MN-DC context for the UE, and wherein the at least one processor is further configured to:

receive a Secondary Node (SN) report from the UE, the SN report comprising measurements for at least one secondary cell; and transmit the SN report to the second master node.

16. The apparatus of claim 15, wherein the at least one processor is further configured to receive information about the SN report from the second master node.

* * * * *